(12) United States Patent
Lee et al.

(10) Patent No.: US 8,368,630 B2
(45) Date of Patent: Feb. 5, 2013

(54) LIQUID CRYSTAL DISPLAY

(75) Inventors: Jaekyun Lee, Suwon-si (KR); Jaeyoung Oh, Goyang-si (KR); Dongsu Shin, Anyang-si (KR); Sanghun Choi, Seoul (KR)

(73) Assignee: LG Display Co., Ltd., Seoul (KR)

( * ) Notice: Subject to any disclaimer, the term of this patent is extended or adjusted under 35 U.S.C. 154(b) by 666 days.

(21) Appl. No.: 12/585,507

(22) Filed: Sep. 16, 2009

(65) Prior Publication Data
US 2010/0110057 A1    May 6, 2010

(30) Foreign Application Priority Data
Oct. 30, 2008 (KR) ................. 10-2008-0107354

(51) Int. Cl.
*G09G 3/36* (2006.01)

(52) U.S. Cl. ............. 345/93; 345/87; 345/90; 345/104; 345/173; 345/211

(58) Field of Classification Search .......... None
See application file for complete search history.

(56) References Cited

U.S. PATENT DOCUMENTS

| | | | |
|---|---|---|---|
| 6,421,039 B1 | 7/2002 | Moon et al. | |
| 7,545,356 B2* | 6/2009 | HoeSup | ........... 345/94 |
| 8,035,662 B2* | 10/2011 | Yajima et al. | ........... 345/690 |
| 2001/0019320 A1* | 9/2001 | Lee et al. | ........... 345/87 |
| 2003/0133066 A1* | 7/2003 | Ono et al. | ........... 349/141 |
| 2006/0145990 A1* | 7/2006 | Kim et al. | ........... 345/94 |
| 2007/0152943 A1* | 7/2007 | Hwang et al. | ........... 345/98 |
| 2007/0153201 A1 | 7/2007 | Lee et al. | |

FOREIGN PATENT DOCUMENTS

| | | |
|---|---|---|
| CN | 1885140 A | 12/2006 |
| TW | 591282 | 6/2004 |
| TW | 200725543 | 7/2007 |

* cited by examiner

*Primary Examiner* — Joseph Haley
*Assistant Examiner* — Ifedayo Iluyomade
(74) *Attorney, Agent, or Firm* — McKenna Long & Aldridge LLP

(57) ABSTRACT

A liquid crystal display is described. The liquid crystal display includes a common voltage generation unit that swings first and second common voltages in opposite directions every a predetermined period of time using two voltage levels, a plurality of first longitudinal common lines that are formed parallel to data lines to supply the first common voltage input through first input units to first pixel common line patterns formed in first pixel units, and a plurality of second longitudinal common lines that are formed parallel to the data lines to supply the second common voltage input through second input units to second pixel common line patterns formed in second pixel units.

14 Claims, 27 Drawing Sheets

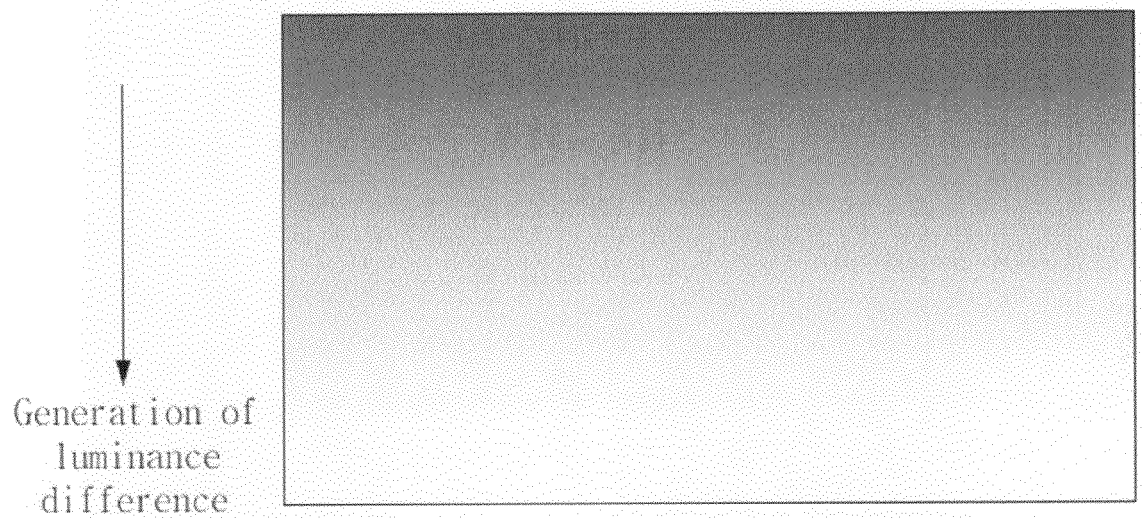

LIQUID CRYSTAL DISPLAY

This application claims the benefit of Korea Patent Application No. 10-2008-0107354 filed on Oct. 30, 2008, the entire contents of which is incorporated herein by reference for all purposes as if fully set forth herein.

BACKGROUND OF THE INVENTION

1. Field of the Invention

Embodiments of the invention relate to a liquid crystal display capable of reducing power consumption without a reduction in the image quality by stabilizing a common voltage.

2. Description of the Related Art

Active matrix type liquid crystal displays image a moving picture using a thin film transistor (TFT) as a switching element. The active matrix type liquid crystal displays have been implemented in televisions as well as display devices in portable devices, such as office equipment and computers, because of the thin profile of an active matrix type liquid crystal displays. Accordingly, cathode ray tubes (CRT) are being rapidly replaced by active matrix type liquid crystal displays.

In the active matrix type liquid crystal displays, a data voltage is applied to a pixel electrode, and a common voltage is applied to a common electrode opposite the pixel electrode. The common electrodes are connected in parallel to common lines. Liquid crystal cells are driven by the voltages applied to the pixel electrodes and the common electrodes.

However, the common voltage is easily distorted by a resistance of the common line or a deviation of the common voltage over the entire surface of a liquid crystal display panel depending on a structure of the common line. For example, in a liquid crystal display in which as many common lines as the number of horizontal lines (i.e., a vertical resolution) are formed parallel to gate lines, because a data voltage is simultaneously applied to pixels of 1 horizontal line through the supply of scan pulses, a load of the common line opposite the pixels increases. Because the load of the common line depends on an amount of RC delay defined by a multiplication of a resistance and a parasitic capacitance of the common line, the resistance of the common line has to be reduced so as to reduce the amount of RC delay. However, as shown in FIG. 1, because a related art liquid crystal display has a structure to receive a common voltage Vcom through only two input sources, it is limited to a reduction in resistances of common lines. As a result, in the related art liquid crystal display, as shown in FIG. 2A, the common voltage Vcom is not kept constant and is affected by a scan pulse SP or a data voltage Vdata. Hence, a ripple phenomenon is generated in the common voltage Vcom. The ripple phenomenon of the common voltage Vcom is a main cause generating a horizontal crosstalk when a specific data pattern is displayed on the screen as shown in FIG. 3A.

In the related art liquid crystal display, the resistance of the common line increases because of the structure of the common line shown in FIG. 1, as the common line goes from right and left sides to a middle portion of the liquid crystal display panel. Therefore, as shown in FIG. 2B, a deviation of the common voltage Vcom over the entire surface of the liquid crystal display panel is caused. The deviation of the common voltage Vcom, as shown in FIG. 3B, causes a luminance difference between upper and lower portions of the liquid crystal display panel and a flicker, and also accumulates a DC component inside the panel to cause image sticking. In most of liquid crystal displays, common lines formed at edges (i.e., a non-display area outside a pixel array) of a panel have wide width so as to reduce resistances of the common lines. However, it is limited to a reduction in the resistances of the common lines because of the limited size of the non-display area. Further, there is a relatively large deviation among resistances of the common lines depending on locations of the common lines.

A method for swing a common voltage in a direction opposite a polarity of a data voltage has been recently proposed so as to reduce power consumption, to improve a response speed, and to reduce the size of chips of data drive integrated circuits (ICs). However, it is difficult to really develop the method for swing the common voltage because of a reduction in the image quality based on the above-described distortion of the common voltage.

SUMMARY OF THE INVENTION

Embodiments of the invention provide a liquid crystal display capable of reducing a distortion of a common voltage by optimally disposing common lines.

Embodiments of the invention provide a liquid crystal display capable of swing a common voltage without causing a reduction in image quality.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

In one aspect, there is a liquid crystal display comprising a liquid crystal display panel including a display area where a plurality of first pixel units each including at least one liquid crystal cell and a plurality of second pixel units each including at least one liquid crystal cell are positioned and a plurality of data lines and a plurality of gate lines are formed to cross each other, a common voltage generation unit that swings a first common voltage and a second common voltage in opposite directions every a predetermined period of time using two voltage levels, a plurality of first longitudinal common lines that are formed parallel to the data lines to supply the first common voltage input through a plurality of first input units to a plurality of first pixel common line patterns formed in the plurality of first pixel units, and a plurality of second longitudinal common lines that are formed parallel to the data lines to supply the second common voltage input through a plurality of second input units to a plurality of second pixel common line patterns formed in the plurality of second pixel units.

The liquid crystal display further comprises a first edge common line that is formed in a non-display area outside the display area to electrically connect the first input units to the first longitudinal common lines, and a second edge common line that is formed in the non-display area separately from the first edge common line to electrically connect the second input units to the second longitudinal common lines.

The liquid crystal display further comprises a plurality of data drive integrated circuits (ICs) for driving the data lines, wherein the first input units include a plurality of first common voltage input pads, each of which is connected to one dummy channel of both dummy channels of each of the data drive ICs, wherein the second input units include a plurality of second common voltage input pads, each of which is connected to the other dummy channel of each of the data drive ICs.

The first and second edge common lines and the first and second pixel common line patterns have the same metal pattern as the gate lines, wherein the first and second longitudinal common lines have the same metal pattern as the data lines.

The first pixel units and the second pixel units are positioned in a mosaic pattern or in a stripe pattern.

When the first pixel units and the second pixel units are positioned in the mosaic pattern, the first pixel common line patterns of the first pixel units on adjacent horizontal lines are connected to the first longitudinal common line between the first pixel common line patterns in zigzags to supply the first common voltage to first common electrodes of the first pixel units, and the second pixel common line patterns of the second pixel units on adjacent horizontal lines are connected to the second longitudinal common line between the second pixel common line patterns in zigzags to supply the second common voltage to second common electrodes of the second pixel units.

Each of the first pixel unit and the second pixel unit includes two horizontally adjacent liquid crystal cells, wherein two gate lines and one data line are assigned to each of the first and second pixel units, wherein the first longitudinal common line and the second longitudinal common line are alternately positioned between horizontally adjacent pixel units.

Each of the first pixel unit and the second pixel unit includes three horizontally adjacent liquid crystal cells, wherein two gate lines and two data lines are assigned to each of the first and second pixel units, wherein the first longitudinal common line and the second longitudinal common line are alternately positioned between horizontally adjacent el pixel units.

Each of the first pixel unit and the second pixel unit includes one liquid crystal cell, wherein one gate line and one data line crossing the middle of the pixel unit are assigned to each of the first and second pixel units, wherein the first longitudinal common line and the second longitudinal common line are alternately positioned between horizontally adjacent pixel units.

The liquid crystal display further comprises a normal edge common line that is separated from the first and second edge common lines in the non-display area to receive a normal common voltage, a plurality of normal longitudinal common lines, each of which is formed between the first and second longitudinal common lines in a direction parallel to the data lines, and a normal common line pattern that partially overlaps pixel electrodes of the liquid crystal cells and is commonly connected to the normal longitudinal common lines.

When the first pixel units and the second pixel units are positioned in the stripe pattern, the first pixel common line patterns of the first pixel units on the same vertical line are commonly connected to the first longitudinal common line crossing the first pixel common line patterns to supply the first common voltage to first common electrodes of the first pixel units, and the second pixel common line patterns of the second pixel units on the same vertical line are commonly connected to the second longitudinal common line crossing the second pixel common line patterns to supply the second common voltage to second common electrodes of the second pixel units.

Each of the first pixel unit and the second pixel unit includes one liquid crystal cell, wherein one gate line and one data line are assigned to each of the first and second pixel units, wherein the first and second longitudinal common lines crossing the middle of vertically adjacent liquid crystal cells are alternately positioned.

One of the two voltage levels is greater than the other, wherein the one voltage level has a potential equal to or greater than a maximum data voltage, and the other voltage level has a potential equal to or less than a minimum data voltage.

The normal common voltage has a voltage level equal to or less than a low voltage level of the first and second common voltages.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings:

FIG. 3B illustrates a luminance difference resulting from an instability of a common voltage in a related art liquid crystal display;

DETAILED DESCRIPTION OF THE EMBODIMENTS

Reference will now be made in detail embodiments of the invention examples of which are illustrated in the accompanying drawings.

Figure 1:
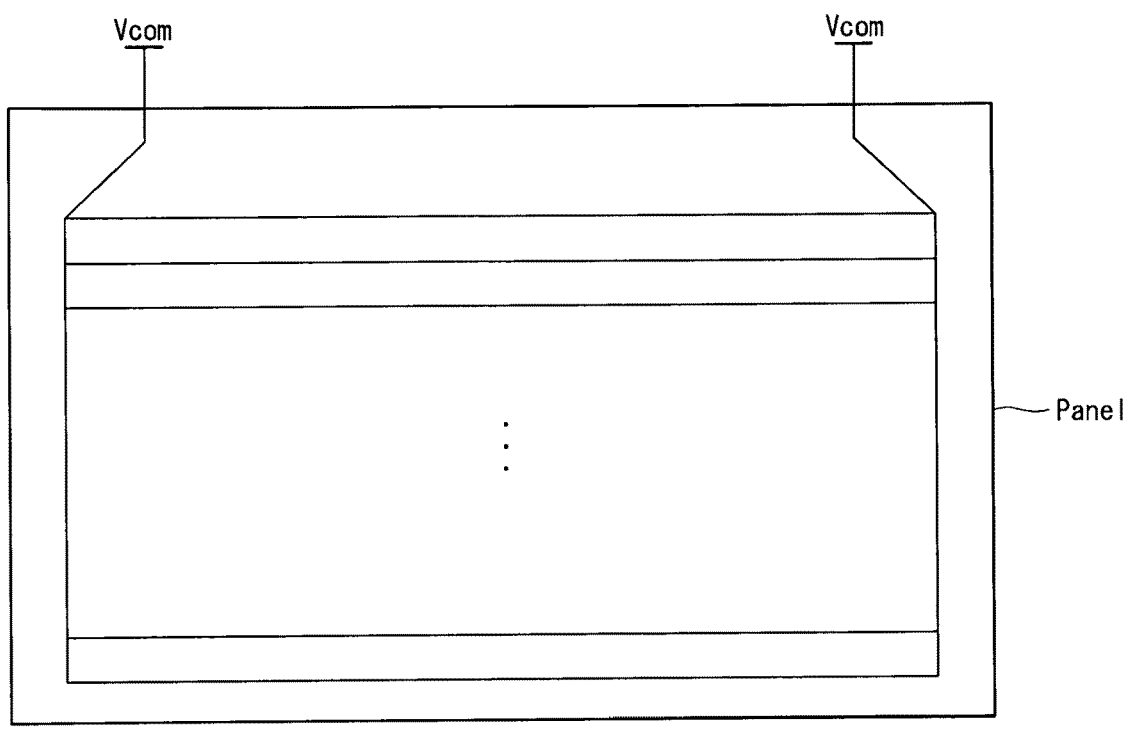
FIG. 1 illustrates a connection structure of a related art common line.
Figure 2A:
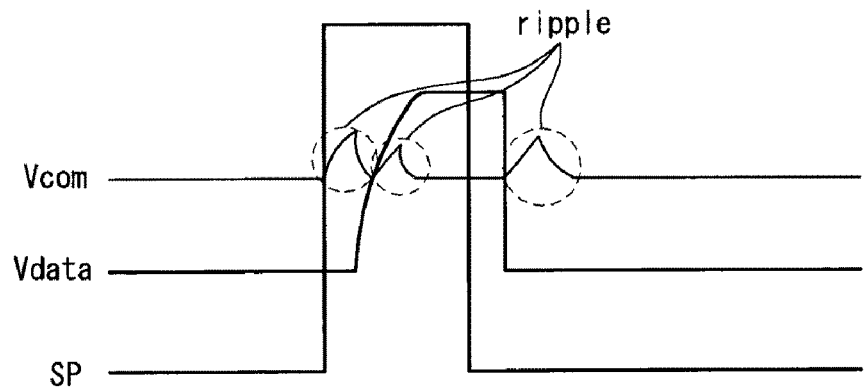
FIG. 2A illustrates a ripple phenomenon resulting from a resistance of a related art common line.
Figure 2B:
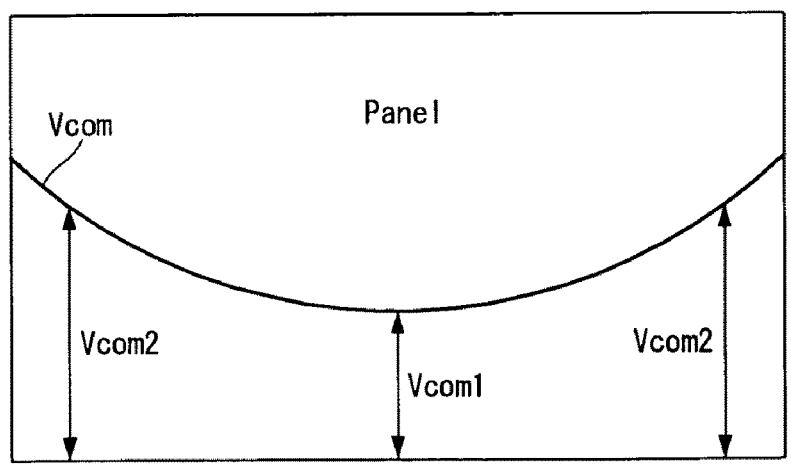
FIG. 2B illustrates a deviation of a common voltage over the entire surface of a related art liquid crystal display panel.
Figure 3A:
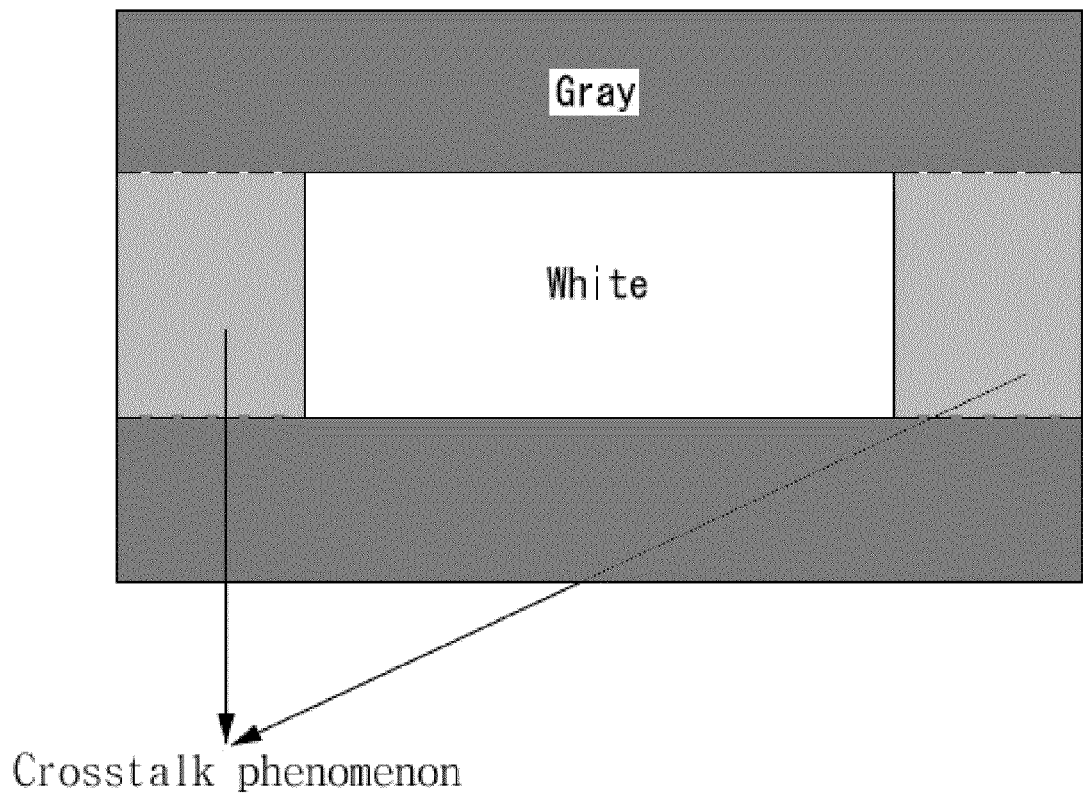
FIG. 3A illustrates a crosstalk phenomenon resulting from an instability of a common voltage in a related art liquid crystal display.
Figure 4:
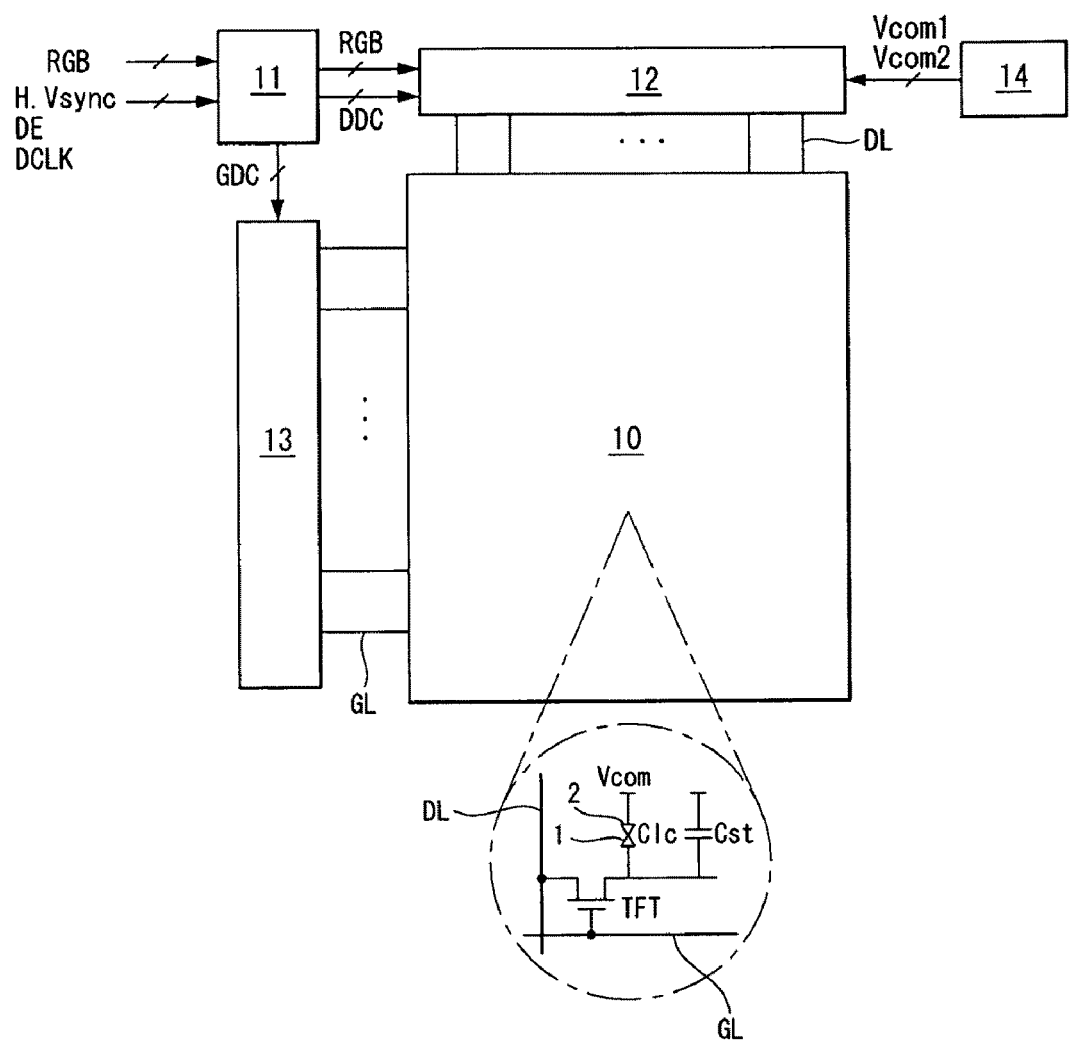
FIG. 4 is a block diagram showing an exemplary configuration of a liquid crystal display according to an embodiment of the invention.

FIG. 4 is a block diagram showing an exemplary configuration of a liquid crystal display according to an embodiment of the invention;

As shown in FIG. 4, a liquid crystal display according to an embodiment of the invention includes a liquid crystal display panel 10, a timing controller 11, a data drive circuit 12, a gate drive circuit 13, and a common voltage generation unit 14.

The liquid crystal display panel 10 includes an upper glass substrate, a lower glass substrate, and a liquid crystal layer between the upper and lower glass substrates. The liquid crystal display panel 10 includes a plurality of liquid crystal cells Clc (i.e., a plurality of subpixels) arranged in a matrix format at each crossing of a plurality of data lines DL and a plurality of gate lines GL.

The data lines DL, the gate lines GL, thin film transistors (TFTs), the liquid crystal cells Clc that are connected to the TFTs and are driven by an electric field between pixel electrodes 1 and common electrodes 2, a storage capacitor Cst, and the like are formed on the lower glass substrate of the liquid crystal display panel 10. A common line includes a first common line and a second common line that are electrically separated from each other. A first common voltage Vcom1 and a second common voltage Vcom2 are supplied to the first common line and the second common line, respectively. The first common voltage Vcom1 and the second common voltage Vcom2 are swung in opposite directions every predetermined period of time. Each of the first and second common lines includes an edge common line formed along edges (i.e., a non-display area) of the lower glass substrate, longitudinal common lines that are formed in a direction parallel to the data lines DL and are connected to the edge common line, and pixel common line patterns that are formed along edges of each liquid crystal cell to have a mesh structure and electrically connect the longitudinal common lines to the common electrodes 2. The first and second common lines are electrically connected to an output terminal of the common voltage generation unit 14, and the common electrodes 2 are electrically connected to the first and second common lines. The first and second common lines may be connected to the common electrodes 2 and may form a storage capacitor Cst of a storage-on-common manner in a pixel array. In this case, the first and second common lines may overlap the pixel electrodes 1 on the lower glass substrate with an insulating layer interposed between the first and second common lines and the pixel electrodes 1. A normal common line separated from the common line may be further provided so as to form the storage capacitor Cst of the storage-on-common manner in the pixel array.

A black matrix, a color filter, and the common electrodes 2 are formed on the upper glass substrate of the liquid crystal display panel 10.

The common electrode 2 is formed on the upper glass substrate in a vertical electric drive manner, such as a twisted nematic (TN) mode and a vertical alignment (VA) mode. The common electrode 2 and the pixel electrode 1 are formed on the lower glass substrate in a horizontal electric drive manner, such as an in-plane switching (IPS) mode and a fringe field switching (FFS) mode.

Polarizing plates each having optical axes that cross at a right angle are attached respectively to the upper and lower glass substrates. Alignment layers for setting a pre-tilt angle of the liquid crystal in an interface contacting the liquid crystal are respectively formed on the upper and lower glass substrates.

The timing controller 11 receives timing signals, such as horizontal and vertical sync signals Hsync and Vsync, a data enable signal DE, a dot clock signal DCLK to generate a data timing control signal DDC for controlling operation timing of the data drive circuit 12 and a gate timing control signal GDC for controlling operation timing of the gate drive circuit 13. The gate timing control signal GDC includes a gate start pulse GSP, a gate shift clock signal GSC, a gate output enable signal GOE, and the like. The gate start pulse GSP indicates a scan start line of a scan operation. The gate shift clock signal GSC controls an output of the gate drive circuit 13 so that the gate drive circuit 13 sequentially shifts the gate start pulse GSP. The gate output enable signal GOE controls an output of the gate drive circuit 13. The data timing control signal DDC includes a source start pulse SSP, a source sampling clock signal SSC, a source output enable signal SOE, a polarity control signal POL, and the like. The source start pulse SSP indicates a start liquid crystal cell in 1 horizontal line to which data will be displayed. The source sampling clock signal SSC indicates a latch operation of data inside the data drive circuit 12 based on a rising or falling edge. The polarity control signal POL controls a polarity of an analog video data voltage output by the data drive circuit 12. The source output enable signal SOE controls an output of a source drive integrated circuit (IC).

The data drive circuit 12 includes a plurality of data drive ICs. Each of the data drive ICs latches digital video data RGB under the control of the timing controller 11, and then converts the digital video data RGB into an analog positive or negative data voltage to supply the analog positive/negative data voltage to the data lines DL. Each of the data drive ICs supplies the first and second common voltages Vcom1 and Vcom2 generated by the common voltage generation unit 14 to the common line using left and right dummy channels of each data drive IC. Each of the data drive ICs usually has dummy channels that do not supply data voltages.

The gate drive circuit 13 includes a plurality of gate drive ICs. The gate drive ICs supply scan pulses to the gate lines GL under the control of the timing controller 11.

The common voltage generation unit 14 generates the first and second common voltages Vcom1 and Vcom2 each having a different voltage level. The first and second common voltages Vcom1 and Vcom2 are swung between two voltage levels in opposite directions every predetermined period of time. More specifically, if the first common voltage Vcom1 has a first voltage level during odd-numbered frame periods and rises or falls at a second voltage level during even-numbered frame periods, the second common voltage Vcom2 has the second voltage level during the odd-numbered frame periods and rises or falls at the first voltage level during the even-numbered frame periods. When one of the first and second voltage levels is greater than the other, the one voltage level has a potential equal to or greater than a maximum data voltage and the other voltage level has a potential equal to or less than a minimum data voltage. Because a voltage of the liquid crystal cells Clc is determined by whether the data voltage is greater or less than the common voltage, the liquid crystal cells Clc to which the common voltage of a high voltage level is applied are negatively charged, and the liquid crystal cells Clc to which the common voltage of a low voltage level is applied are positively charged. Hence, a swing width of the data voltage for an inversion drive is reduced to ½ of a swing width of the data voltage when the common voltage having a constant level is supplied. If the swing width of the data voltage is reduced, power consumption in the data drive IC is reduced and a response speed of liquid crystals increases. Hence, a driving margin of the liquid crystals increases, and heat generation in the data drive IC is reduced. A method for preventing a distortion of the common voltage to stabilize the common voltage is demanded so that a method for swing the common voltage is applied. A method for reducing a distortion of the common voltage by optimally disposing the common lines is provided later.

Figure 5:
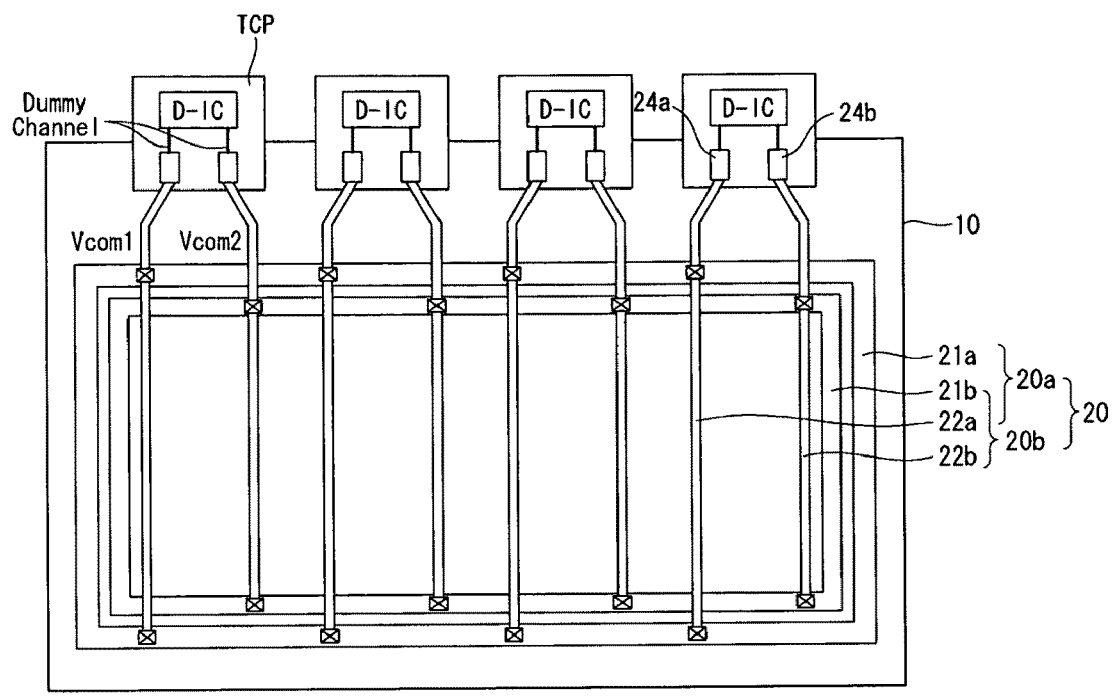
FIG. 5 is a plane view of a common line according to an exemplary embodiment of the invention.
Figure 6:
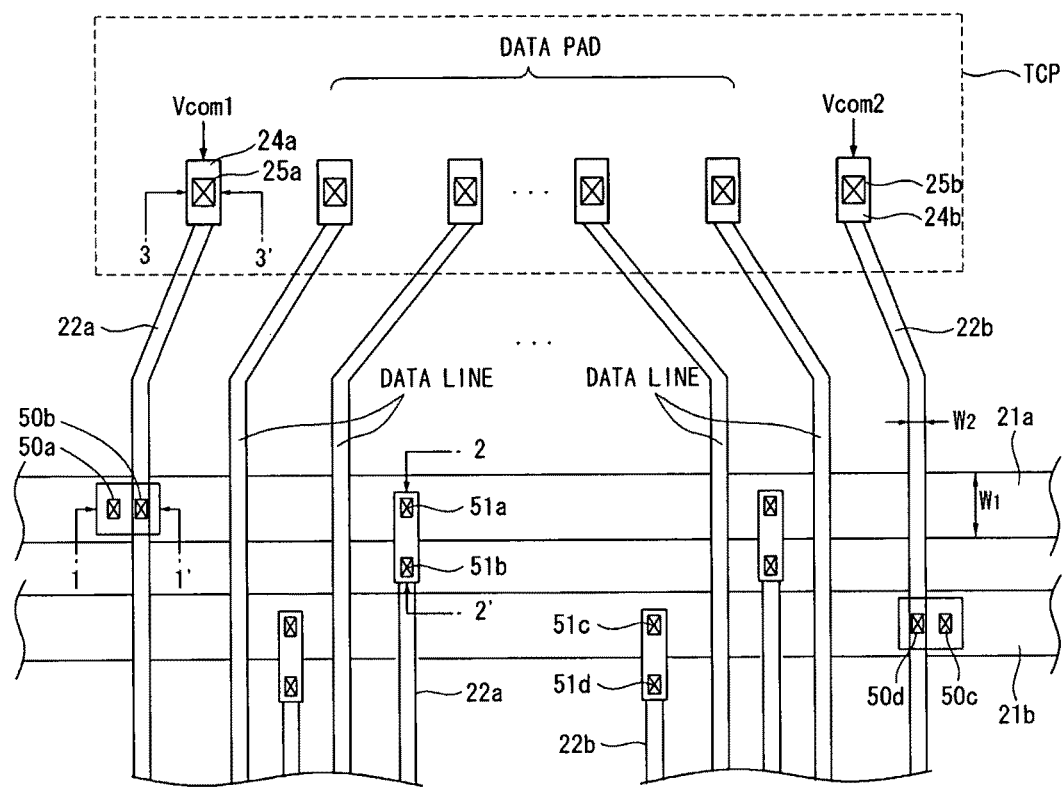
FIG. 6 is a plane view showing a common line and data lines.
Figure 7:
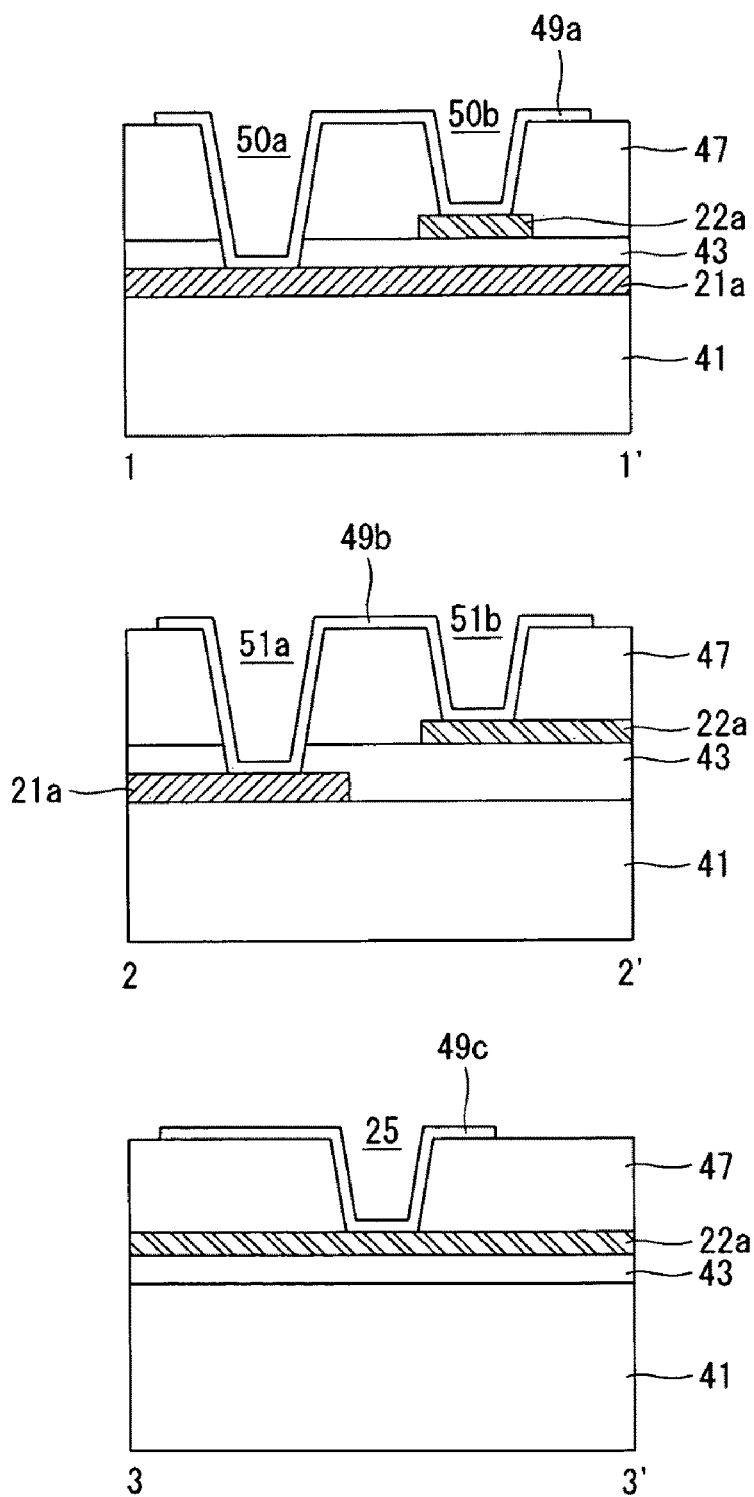
FIG. 7 is a cross-sectional view showing a cross-sectional structure of a common line taken along lines 1-1', 2-2' and 3-3' shown in FIG. 6.

FIG. 5 is a plane view of the common line according to the embodiment of the invention. FIG. 6 is a plane view showing a portion of the common line and a portion of the data lines. FIG. 7 is a cross-sectional view showing a cross-sectional structure of a common line taken along lines 1-1', 2-2' and 3-3' shown in FIG. 6. In FIG. 7, a reference numeral 41 denotes a lower glass substrate, 43 a gate insulating layer, and 47 a protective layer.

As shown in FIGS. 5 to 7, a common line 20 includes a first common line 20a and a second common line 20b that are electrically separated from each other. The first common line 20a includes a first edge common line 21a that is formed at an edge of a substrate to have a relatively wide width, a plurality of first longitudinal common lines 22a longitudinally extending in a direction parallel to the data lines, and a plurality of first pixel common line patterns, each of which is formed in each of a plurality of first pixel units including at least one liquid crystal cell. The second common line 20b includes a second edge common line 21b that is formed at an edge of a substrate to have a relatively wide width and is electrically separated from the first edge common line 21a, a plurality of second longitudinal common lines 22b longitudinally extending in a direction parallel to the data lines, and a plurality of second pixel common line patterns, each of which is formed in each of a plurality of second pixel units including at least one liquid crystal cell. The first and second edge common lines 21a and 21b are formed of the same material as the gate lines. The pixel common line patterns formed of the same material as the gate lines will be described later with reference to FIGS. 8 to 30.

The first longitudinal common lines 22a are connected to first Vcom pads 24a to receive the first common voltage Vcom1. The first longitudinal common line 22a directly connected to the first Vcom pad 24a is electrically connected to the first edge common line 21a through first and second common line contact holes 50a and 50b. In the first common line contact hole 50a, a portion of the first edge common line 21a not overlapping the first longitudinal common line 22a is connected to a first connection pattern 49a. In the second common line contact hole 50b, a portion of the first longitudinal common line 22a overlapping the first edge common line 21a is connected to the first connection pattern 49a. The first longitudinal common line 22a, that is not directly connected to the first Vcom pad 24a, is electrically connected to the first edge common line 21a through third and fourth common line contact holes 51a and 51b. In the third common line contact hole 51a, a portion of the first edge common line 21a not overlapping the first longitudinal common line 22a is connected to a second connection pattern 49b. In the fourth common line contact hole 51b, a portion of the first longitudinal common line 22a overlapping the first edge common line 21a is connected to the second connection pattern 49b. The first Vcom pad 24a is connected to the first longitudinal common line 22a through a first Vcom contact hole 25a. In the first Vcom contact hole 25a, the first longitudinal common line 22a is connected to a third connection pattern 49c. The first longitudinal common lines 22a are formed of the same material as the data lines.

The second longitudinal common lines 22b are connected to second Vcom pads 24b to receive the second common voltage Vcom2. The second longitudinal common line 22b directly connected to the second Vcom pad 24b is electrically connected to the second edge common line 21b through fifth and sixth common line contact holes 50c and 50d. The second longitudinal common line 22b, that is not directly connected to the second Vcom pad 24b, is electrically connected to the second edge common line 21b through seventh and eighth common line contact holes 51c and 51d. The second Vcom pad 24b is connected to the second longitudinal common line 22b through a second Vcom contact hole 25b. The second longitudinal common lines 22b are formed of the same material as the data lines.

The first and second Vcom pads 24a and 24b are assigned to each data drive IC D-IC so that the first and second Vcom pads 24a and 24b are respectively connected to two dummy channels at of each data drive IC D-IC. The first Vcom pad 24a transfers the first common voltage Vcom1 supplied via the data drive IC D-IC to the first common line 20a. The second Vcom pad 24b transfers the second common voltage Vcom2 supplied via the data drive IC D-IC to the second common line 20b. The first and second Vcom pads 24a and 24b may be respectively connected to first and second output terminals of the common voltage generation unit 14 to respectively transfer the first and second common voltages Vcom1 and Vcom2 from the common voltage generation unit 14 to the first and second common lines 20a and 20b without passing through the data drive IC D-IC. In the embodiment of the invention, the number of input sources for supplying the common voltages Vcom1 and Vcom2 greatly increases as compared with two input sources for supplying the common voltage in the related art. Namely, because as many Vcom pads for supplying the common voltages Vcom1 and Vcom2 as the number of data drive ICs are provided, a deviation of the common voltage over the entire surface of the liquid crystal display panel 10 can be greatly reduced. Further, a resistance of the common line 20 can be greatly reduced.

A width W1 of each of the first and second edge common lines 21a and 21b is greater than a width W2 of each of the first and second longitudinal common lines 22a and 22b so as to reduce resistances of the first and second common lines 20a and 20b. It is preferable that the width W2 of each of the first and second longitudinal common lines 22a and 22b is smaller than a width of each data line so as to prevent a reduction in an aperture ratio in the pixel array.

As described above, because the liquid crystal display according to the embodiment of the invention includes the common lines 20a and 20b including the edge common lines 21a and 21b of the relatively wide width and the longitudinal common lines 22a and 22b that are connected to the edge common lines 21a and 21b and extend in a direction parallel to the data lines, a load of the common lines 20a and 20b can be distributed, and a distortion of the common line 20 can be reduced. For example, in the related art, because common lines are formed in a direction parallel to gate lines, when 1 horizontal line is scanned by a scan pulse, one common line is affected by a data voltage applied to all of liquid crystal cells on the 1 horizontal line. However, in the embodiment of the invention, when 1 horizontal line is scanned by a scan pulse, only a data voltage applied to a pixel unit affects the longitudinal common lines. Therefore, the load of the common line is greatly distributed.

Figure 8:
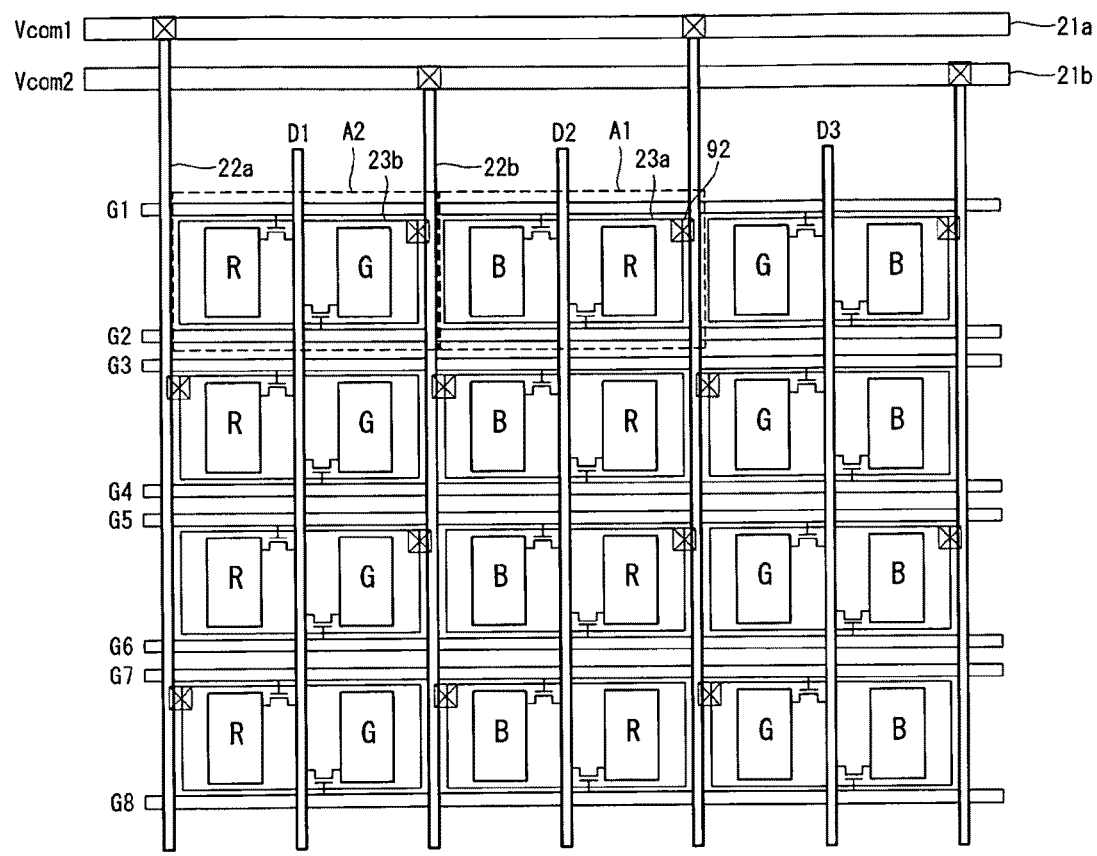
FIG. 8 illustrates a first exemplary configuration of a liquid crystal display panel for stably swinging a common voltage.

FIG. 8 illustrates a first exemplary configuration of the liquid crystal display panel 10 capable of stably supplying two common voltages, that are swung in opposite directions, to pixel units using the longitudinal common lines and the pixel common line patterns.

As shown in FIG. 8, in the first exemplary configuration of the liquid crystal display panel 10, the liquid crystal display according to the embodiment of the invention includes a plurality of pixel units, each of which includes two horizontally adjacent liquid crystal cells and a pixel common line pattern having a mesh structure in each of the two horizontally adjacent liquid crystal cells. Two gate lines and one data line are assigned to each pixel unit. The first longitudinal common line 22a and the second longitudinal common line 22b are alternately positioned between the horizontally adjacent pixel units.

A plurality of first pixel units A1 and a plurality of second pixel units A2 constituting the plurality of pixel units are positioned in a mosaic pattern. Each of the first pixel units A1 receives the first common voltage Vcom1 through a first pixel common line pattern 23a connected to the first longitudinal common line 22a. Each of the second pixel units A2 receives the second common voltage Vcom2 through a second pixel common line pattern 23b connected to the second longitudinal common line 22b. The first pixel common line patterns 23a of the first pixel units A1 on adjacent horizontal lines are connected to the first longitudinal common line 22a between the first pixel common line patterns 23a in zigzags to supply the first common voltage Vcom1 to common electrodes of the first pixel units A1. The second pixel common line patterns 23b of the second pixel units A2 on adjacent horizontal lines are connected to the second longitudinal common line 22b between the second pixel common line patterns 23b in zigzags to supply the second common voltage Vcom2 to common electrodes of the second pixel units A2.

Figure 9:
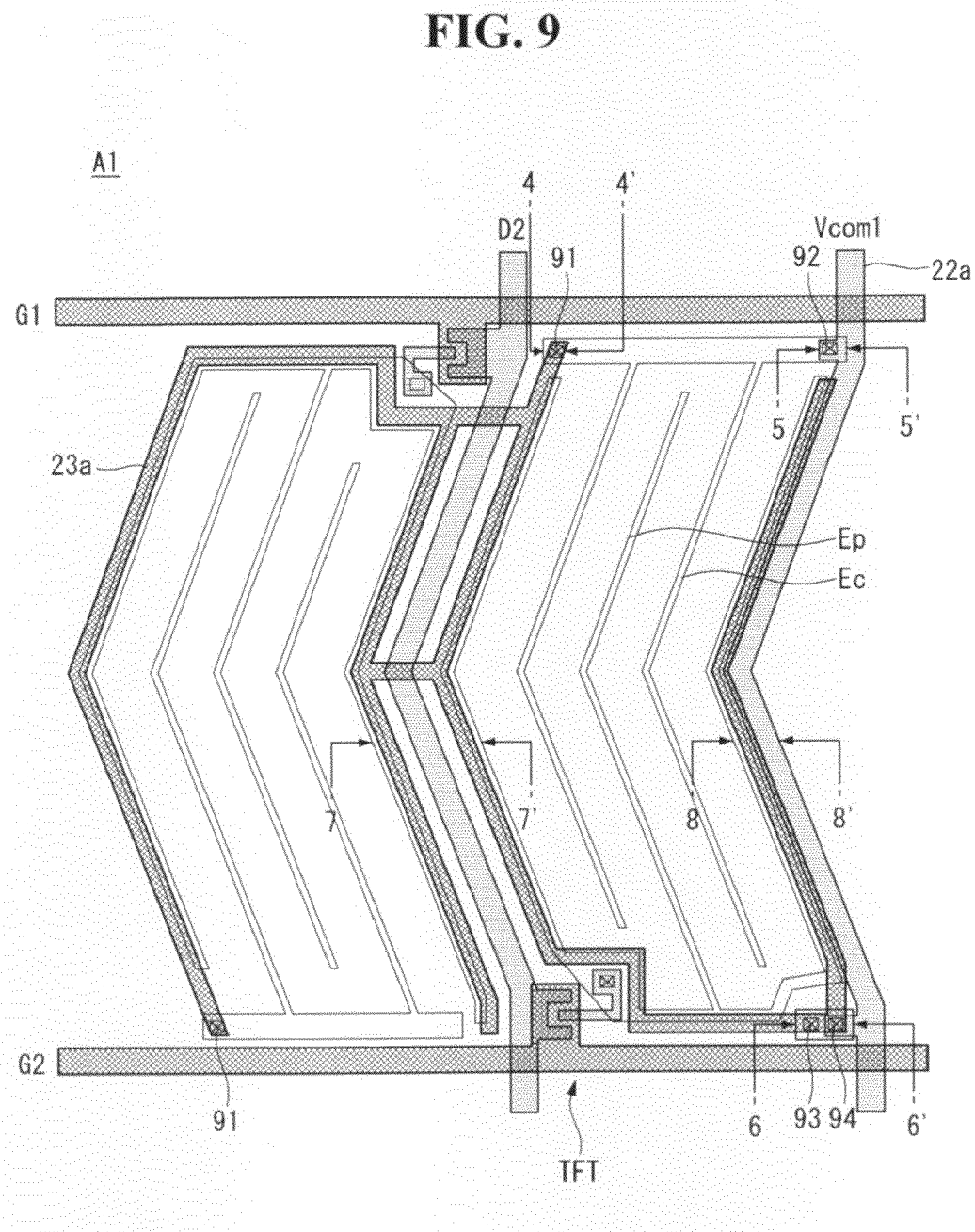
FIG. 9 is a plane view illustrating an exemplary operation of a first pixel unit shown in FIG. 8.
Figure 10:
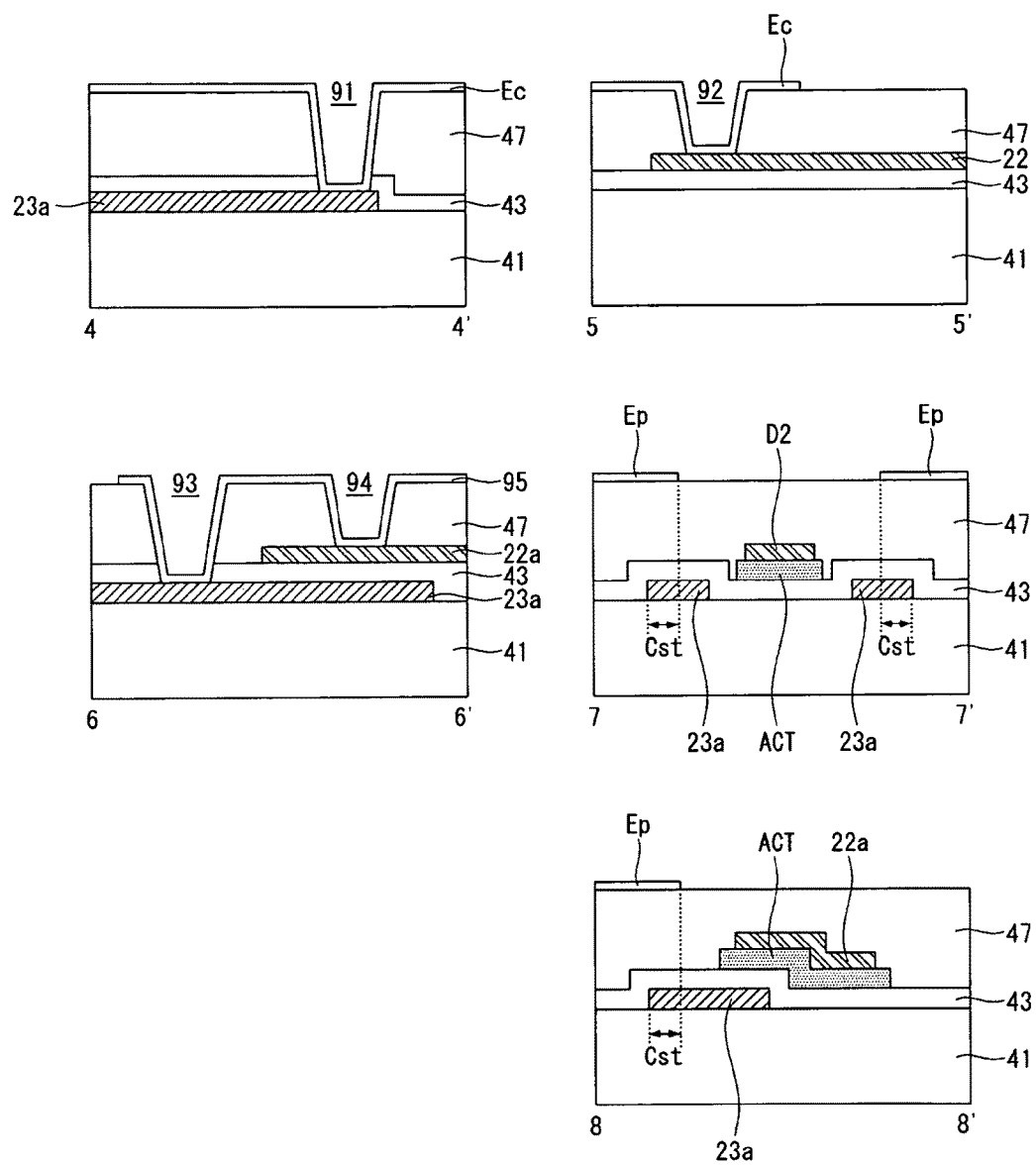
FIG. 10 is a cross-sectional view illustrating a connection structure taken along lines 4-4', 5-5', 6-6', 7-7', and 8-8' of FIG. 9.

FIG. 9 illustrates an exemplary operation of the first pixel unit A1 shown in FIG. 8 in a super in-plane switching (IPS) mode. FIG. 10 illustrates a connection structure among the first longitudinal common line 22a, the first pixel common line pattern 23a, and the common electrode taken along lines 4-4', 5-5', 6-6', 7-7', and 8-8' of FIG. 9.

As shown in FIGS. 9 and 10, the first pixel unit A1 includes two liquid crystal cells each including a common electrode Ec and a pixel electrode Ep that are positioned opposite to each other on the same plane. The common electrode Ec of each liquid crystal cell is connected to the first pixel common line pattern 23a through a first contact hole 91 exposing a portion of the first pixel common line pattern 23a having the mesh structure. The common electrode Ec of one liquid crystal cell is connected to the first longitudinal common line 22a through a second contact hole 92. The first pixel common line pattern 23a is again connected to the first longitudinal common line 22a through third and fourth contact holes 93 and 94 and a transparent electrode pattern 95. A storage capacitor Cst is formed in an overlap area of the first pixel common line pattern 23a and the pixel electrode Ep.

Figure 11:
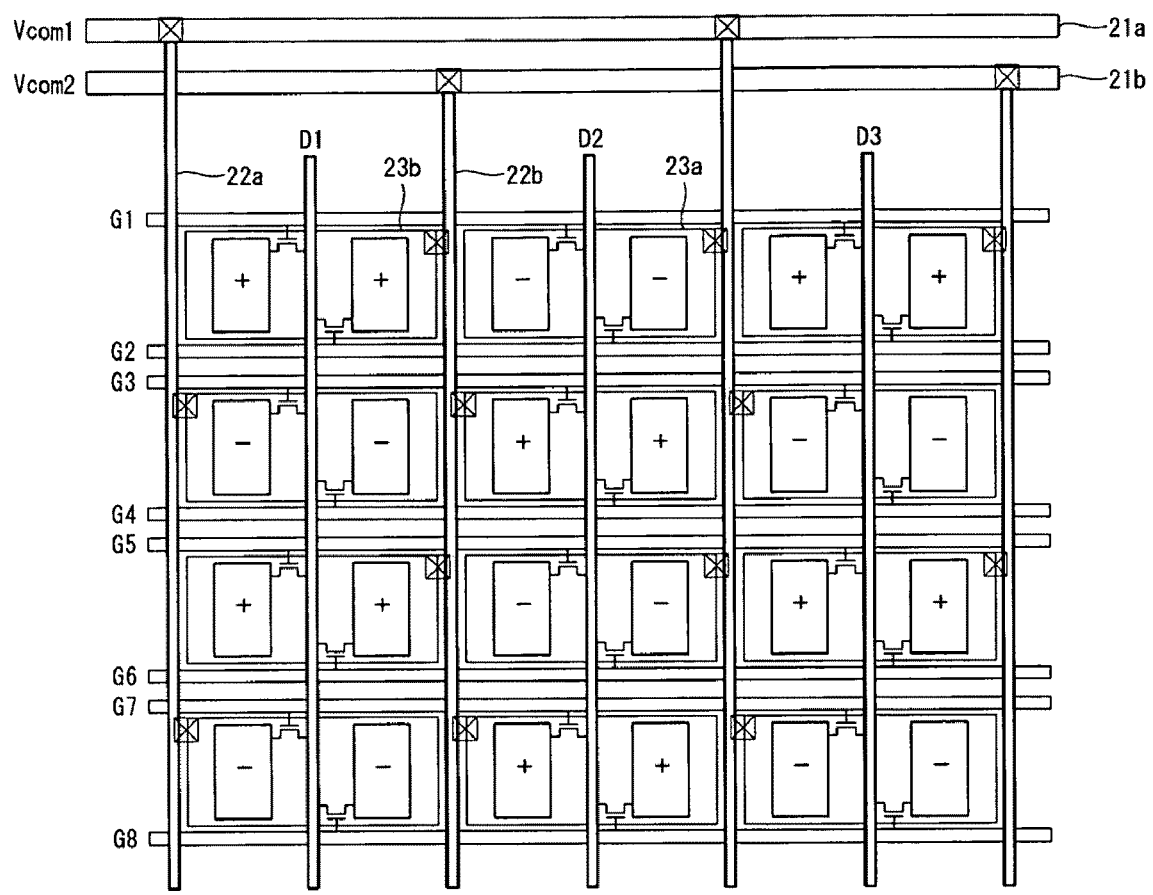
FIG. 11 illustrates a driving state of the liquid crystal display panel shown in FIG. 8 in a predetermined frame in which a first common voltage is greater than a second common voltage.
Figure 12A:
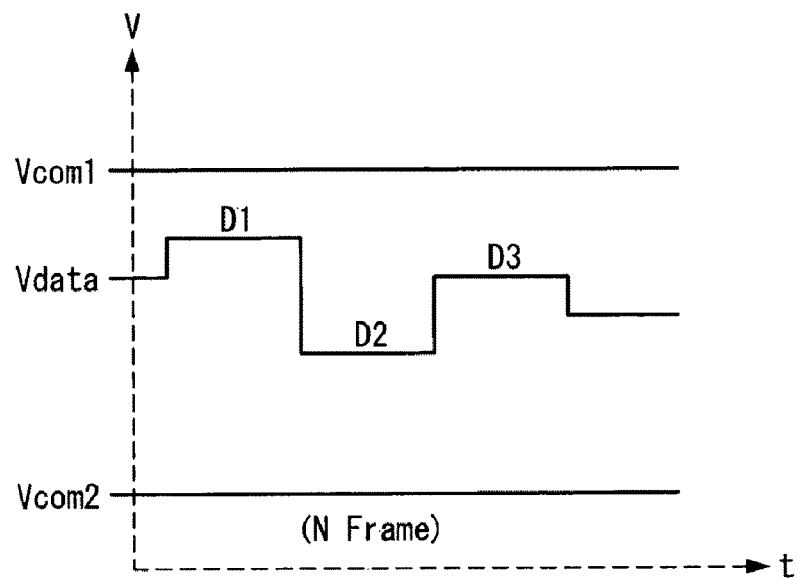
FIGS. 12a and 12b illustrate changes in first and second common voltages during frames.
Figure 12B:
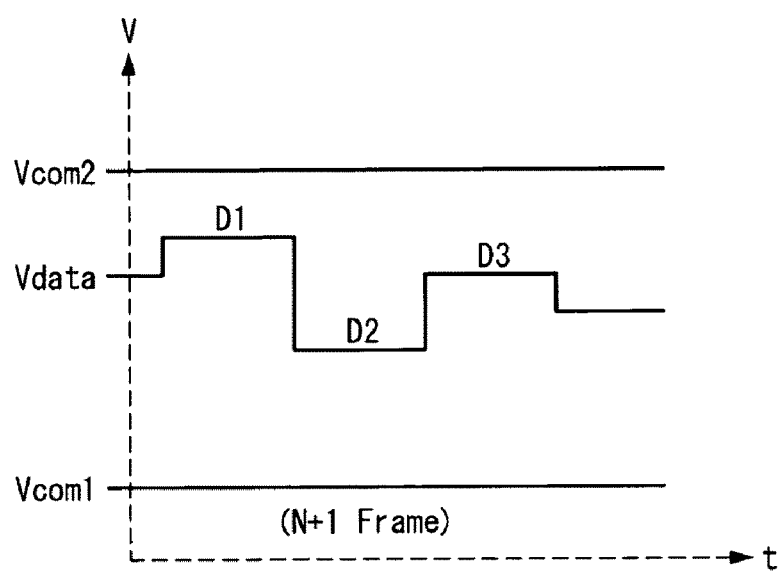

FIG. 11 illustrates a driving state of the liquid crystal display panel 10 having the first exemplary configuration in a predetermined frame in which the first common voltage Vcom1 is greater than the second common voltage Vcom2. FIGS. 12a and 12b illustrate changes in the first and second common voltages Vcom1 and Vcom2 during frame periods.

As shown in FIGS. 11 to 12B, because the first common voltage Vcom1 is greater than the maximum data voltage and the second common voltage Vcom2 is less than the minimum data voltage during an Nth frame period, a pixel unit receiving the first common voltage Vcom1 is negatively charged and a pixel unit receiving the second common voltage Vcom2 is positively charged. Hence, the liquid crystal display panel 10 has a charge polarity of a horizontal 2-dot inversion scheme. Although it is not shown, potentials of the first and second common voltages Vcom1 and Vcom2 during the Nth frame period are opposite to each other during an (N+1)th frame period. Therefore, a pixel unit receiving the first common voltage Vcom1 is positively charged and a pixel unit receiving the second common voltage Vcom2 is negatively charged during the (N+1)th frame period.

In the first exemplary configuration of the liquid crystal display panel 10, a distortion of the common voltage can be reduced by optimally disposing the common lines. Hence, a swing width of the data voltage can be reduced by stably swing the common voltage without causing a reduction in the image quality such as ripple or flicker. As a result, power consumption can be reduced, a response speed can increase, and the number of data drive ICs and the chip size the of data drive ICs can be reduced. Furthermore, in the first exemplary configuration of the liquid crystal display panel 10, because the number of data lines is reduced to ½ of the number of data lines in the related art and two liquid crystal cells share one longitudinal common line, an aperture ratio can increases by about 10% or more as compared with the related art.

Figure 13:
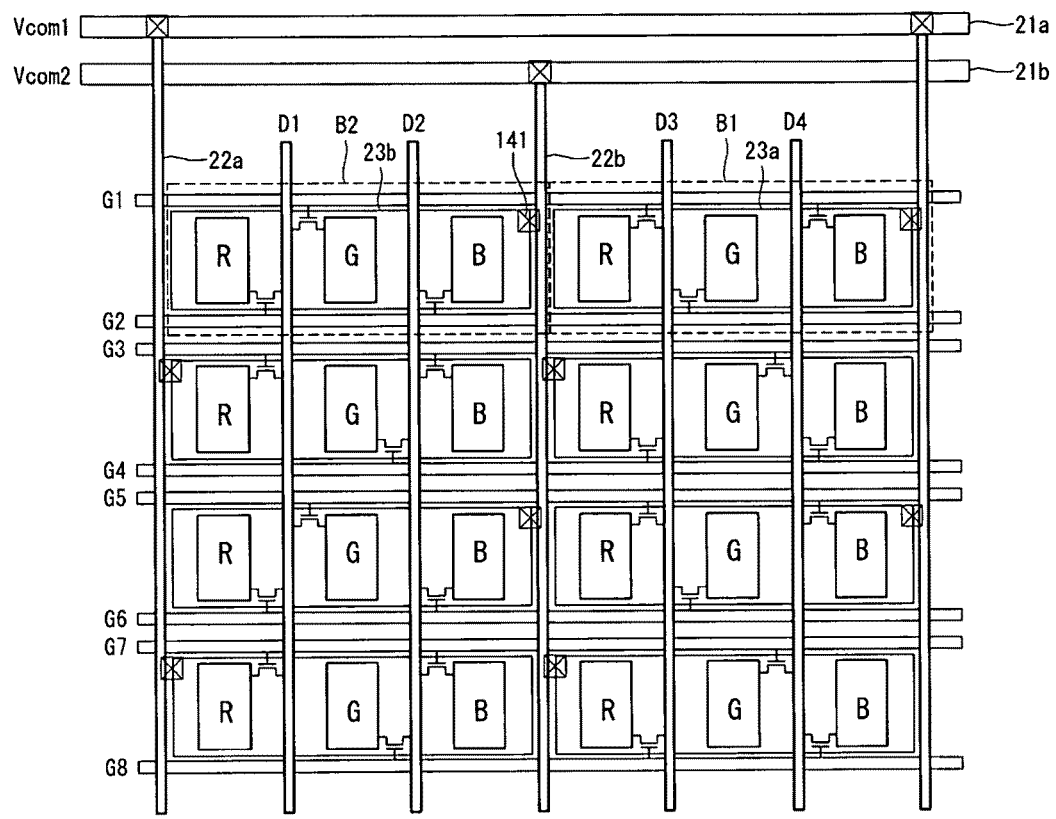
FIG. 13 illustrates a second exemplary configuration of a liquid crystal display panel for stably swinging a common voltage.

FIG. 13 illustrates a second exemplary configuration of the liquid crystal display panel 10 capable of stably supplying two common voltages, that are swung in opposite directions, to pixel units using the longitudinal common lines and the pixel common line patterns.

As shown in FIG. 13, in the second exemplary configuration of the liquid crystal display panel 10, the liquid crystal display according to the embodiment of the invention includes a plurality of pixel units, each of which includes three horizontally adjacent liquid crystal cells and a pixel common line pattern having a mesh structure in each of the three horizontally adjacent liquid crystal cells. Two gate lines and two data line are assigned to each pixel unit. The first longitudinal common line 22a and the second longitudinal common line 22b are alternately positioned between the horizontally adjacent pixel units.

A plurality of first pixel units B1 and a plurality of second pixel units B2 constituting the plurality of pixel units are positioned in a mosaic pattern. Each of the first pixel units B1 receives the first common voltage Vcom1 through a first pixel common line pattern 23a connected to the first longitudinal common line 22a. Each of the second pixel units B2 receives the second common voltage Vcom2 through a second pixel common line pattern 23b connected to the second longitudinal common line 22b. The first pixel common line patterns 23a of the first pixel units B1 on adjacent horizontal lines are connected to the first longitudinal common line 22a between the first pixel common line patterns 23a in zigzags to supply the first common voltage Vcom1 to common electrodes of the first pixel units B1. The second pixel common line patterns 23b of the second pixel units B2 on adjacent horizontal lines are connected to the second longitudinal common line 22b between the second pixel common line patterns 23b in zigzags to supply the second common voltage Vcom2 to common electrodes of the second pixel units B2.

Figure 14:
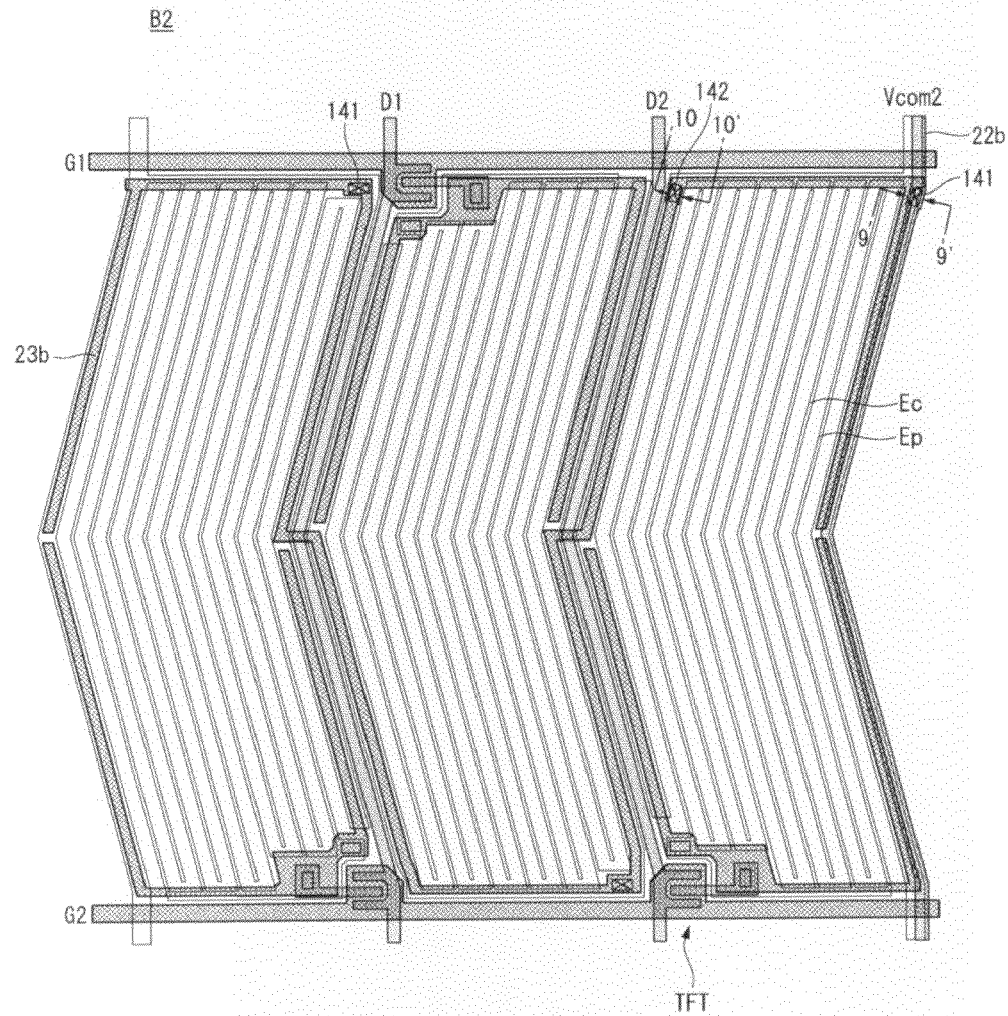
FIG. 14 is a plane view illustrating an exemplary operation of a second pixel unit shown in FIG. 13.
Figure 15:
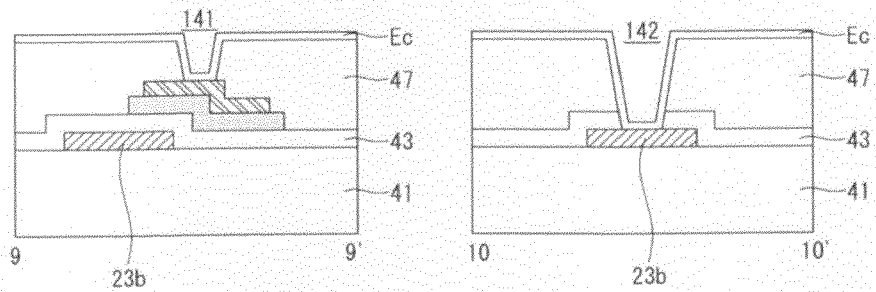
FIG. 15 is a cross-sectional view illustrating a connection structure taken along lines 9-9' and 10-10' of FIG. 14.

FIG. 14 illustrates an exemplary operation of the second pixel unit B2 shown in FIG. 13 in a super IPS mode. FIG. 15 illustrates a connection structure among the second longitudinal common line 22b, the second pixel common line pattern 23b, and the common electrode taken along lines 9-9' and 10-10' of FIG. 14.

As shown in FIGS. 14 and 15, the second pixel unit B2 includes three liquid crystal cells each including a common electrode Ec and a pixel electrode Ep that are positioned opposite to each other on the same plane. The common electrode Ec of the liquid crystal cell partially overlapping the second longitudinal common line 22b is connected to the second longitudinal common line 22b through a first contact hole 141. The common electrodes Ec of the liquid crystal cells at both sides of the second pixel unit B2 are connected to the second pixel common line pattern 23b through a second contact hole 142 exposing a portion of the second pixel common line pattern 23b having a full mesh structure. A storage capacitor Cst is formed in an overlap area of the second pixel common line pattern 23b and the pixel electrode Ep. Fingers of the common electrode Ec and fingers of the pixel electrode Ep are formed parallel to the data lines.

Figure 16:
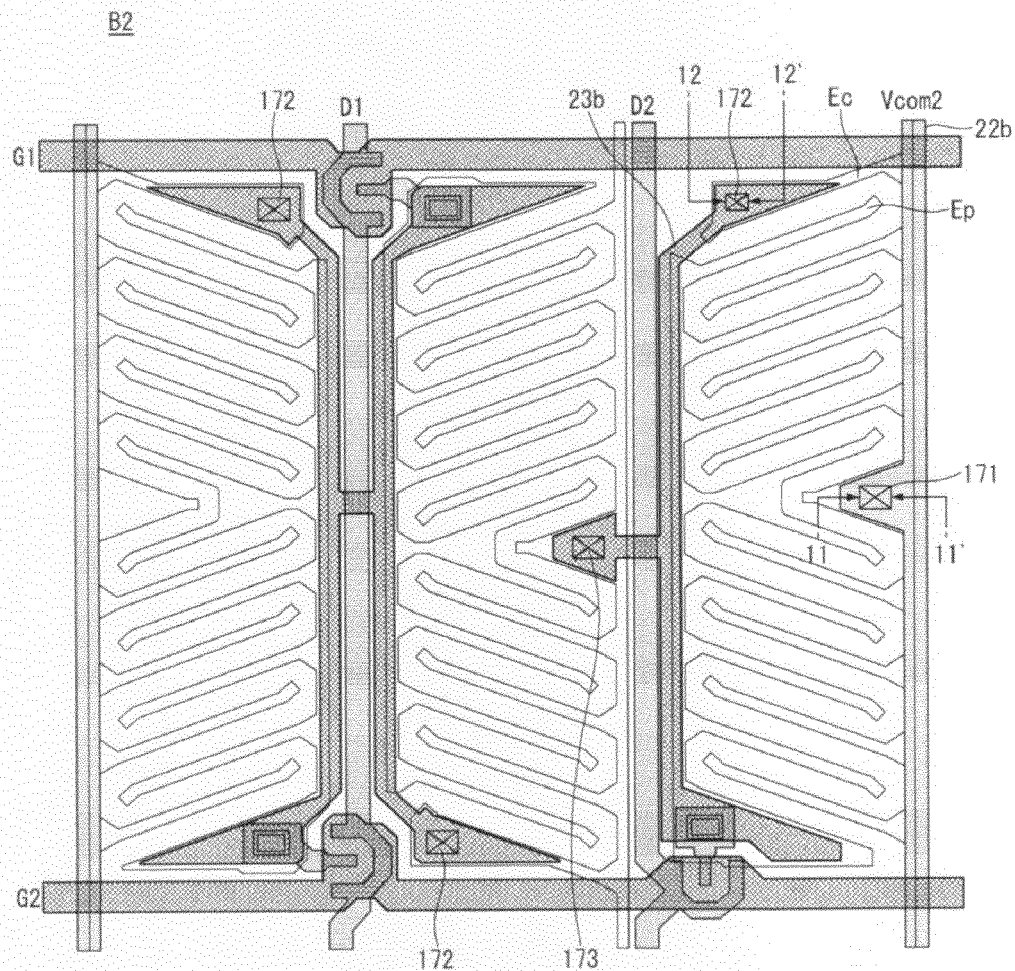
FIG. 16 is a plane view illustrating another exemplary operation of a second pixel unit shown in FIG. 13.
Figure 17:
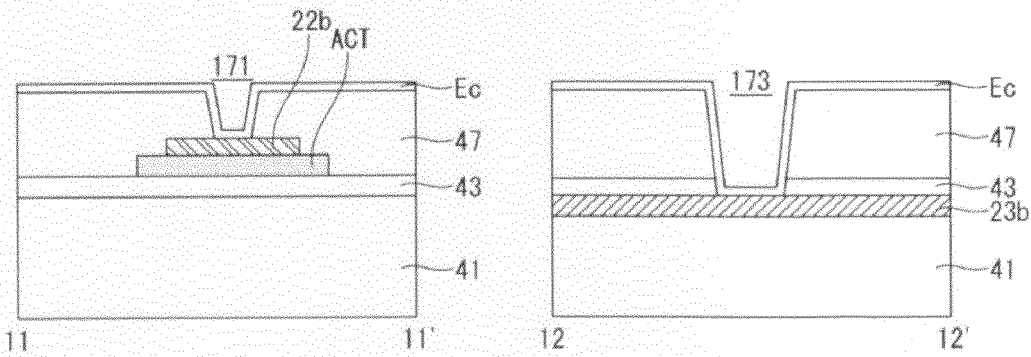
FIG. 17 is a cross-sectional view illustrating a connection structure taken along lines 11-11' and 12-12' of FIG. 16.

FIG. 16 illustrates an exemplary operation of the second pixel unit B2 shown in FIG. 13 in a horizontal IPS mode. FIG. 17 illustrates a connection structure among the second longitudinal common line 22b, the second pixel common line pattern 23b, and the common electrode Ec taken along lines 11-11' and 12-12' of FIG. 16.

As shown in FIGS. 16 and 17, the second pixel unit B2 includes three liquid crystal cells each including a common electrode Ec and a pixel electrode Ep that are positioned opposite to each other on the same plane. The common electrode Ec of the liquid crystal cell partially overlapping the second longitudinal common line 22b is connected to the second longitudinal common line 22b through a first contact hole 171. The common electrode Ec of each liquid crystal cell is connected to the second pixel common line pattern 23b through a second contact hole 172 exposing a portion of the second pixel common line pattern 23b having a half mesh structure. The common electrode Ec of a middle liquid crystal cell of the three liquid crystal cells is connected to the second pixel common line pattern 23b through a third contact hole 173. A cross-sectional structure of the third contact hole 173 is the substantially same as a cross-sectional structure of the first contact hole 171. A storage capacitor Cst is formed in an overlap area of the second pixel common line pattern 23b and the pixel electrode Ep. Fingers of the common electrode Ec and fingers of the pixel electrode Ep incline to the data lines.

Figure 18:
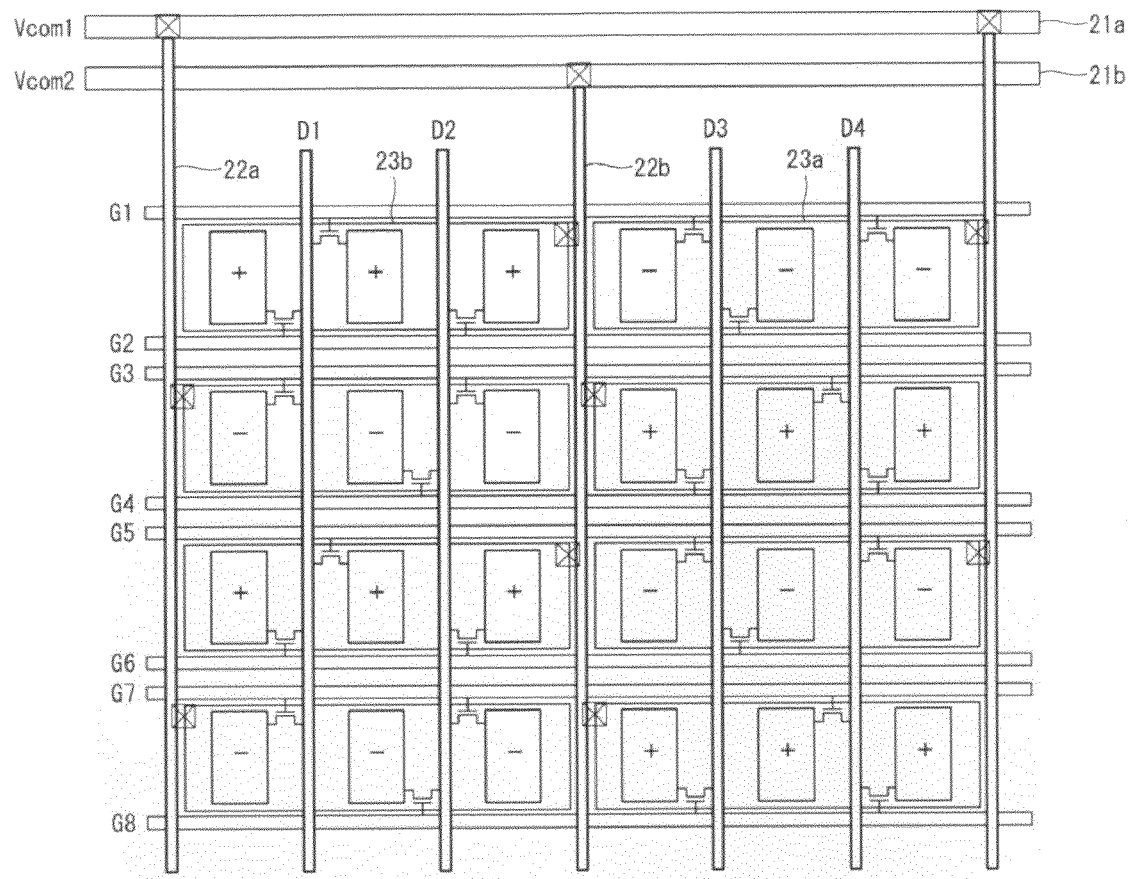
FIG. 18 illustrates a driving state of the liquid crystal display panel shown in FIG. 13 in a predetermined frame in which a first common voltage is greater than a second common voltage.

FIG. 18 illustrates a driving state of the liquid crystal display panel 10 having the second exemplary configuration in a predetermined frame in which the first common voltage Vcom1 is greater than the second common voltage Vcom2.

As shown in FIGS. 12A and 12B together with FIG. 18, because the first common voltage Vcom1 is greater than the maximum data voltage and the second common voltage Vcom2 is less than the minimum data voltage during an Nth frame period, a pixel unit receiving the first common voltage Vcom1 is negatively charged and a pixel unit receiving the second common voltage Vcom2 is positively charged. Hence, the liquid crystal display panel 10 has a charge polarity of a horizontal 3-dot inversion scheme. Although it is not shown, potentials of the first and second common voltages Vcom1 and Vcom2 during the Nth frame period are opposite to each other during an (N+1)th frame period. Therefore, a pixel unit receiving the first common voltage Vcom1 is positively charged and a pixel unit receiving the second common voltage Vcom2 is negatively charged during the (N+1)th frame period.

In the second exemplary configuration of the liquid crystal display panel 10, the distortion of the common voltage can be reduced by optimally disposing the common lines. Hence, a swing width of the data voltage can be reduced by stably swing the common voltage without causing a reduction in the image quality such as ripple or flicker. As a result, the power consumption can be reduced, driving margins of the liquid crystals can increase by increasing the response speed, and the number of data drive ICs and the chip size the of data drive ICs can be reduced. Furthermore, in the second exemplary configuration of the liquid crystal display panel 10, because the number of data lines is reduced to ½ of the number of data lines in the related art and three liquid crystal cells share one longitudinal common line, an aperture ratio can greatly increase.

Figure 19:
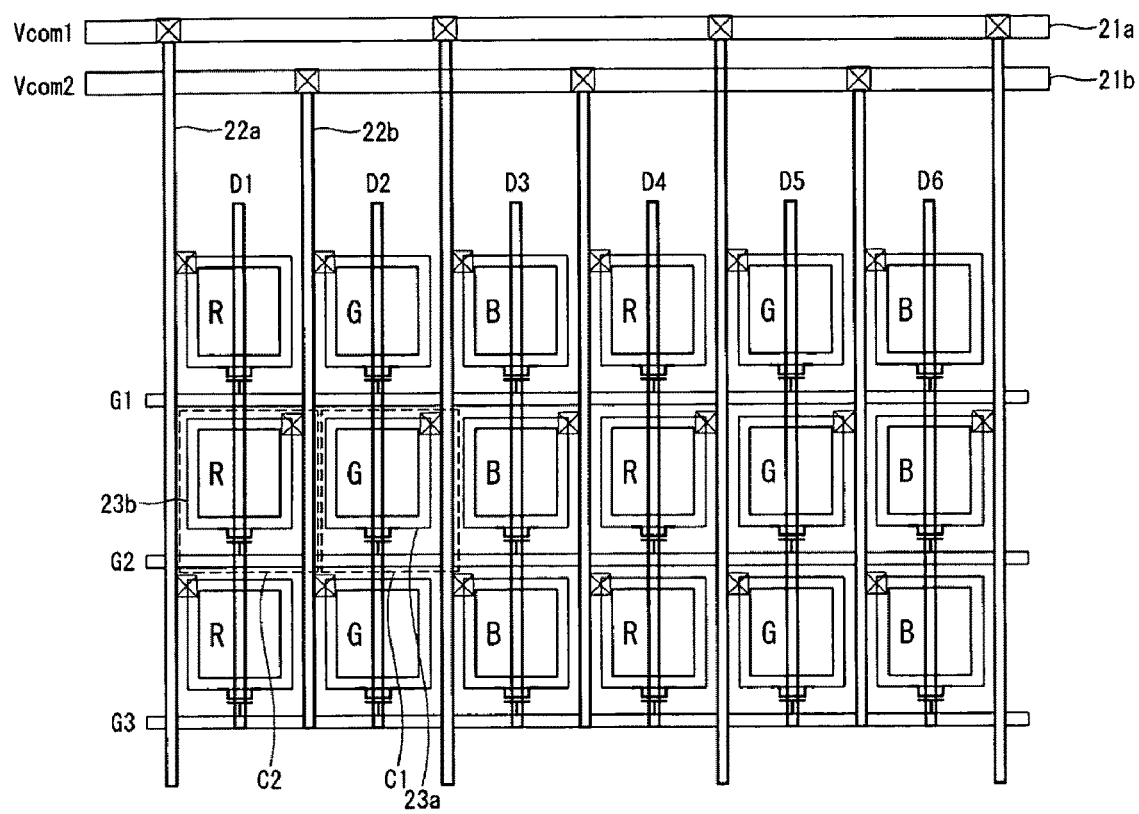
FIG. 19 illustrates a third exemplary configuration of a liquid crystal display panel for stably swinging a common voltage.

FIG. 19 illustrates a third exemplary configuration of the liquid crystal display panel 10 capable of stably supplying two common voltages, that are swung in opposite directions, to pixel units using the longitudinal common lines and the pixel common line patterns.

As shown in FIG. 19, in the third exemplary configuration of the liquid crystal display panel 10, the liquid crystal display according to the embodiment of the invention includes a plurality of pixel units, each of which includes one liquid crystal cell and a pixel common line pattern having a mesh structure in the liquid crystal cell. One gate line and one data line are assigned to each pixel unit. The first longitudinal common line 22a and the second longitudinal common line 22b are alternately positioned between horizontally adjacent pixel units. One liquid crystal cell is divided into two domains so that each of the data lines crosses the middle of vertically adjacent liquid crystal cells. For this, two TFTs are formed in each liquid crystal cell.

A plurality of first pixel units C1 and a plurality of second pixel units C2 constituting the plurality of pixel units are positioned in a mosaic pattern. Each of the first pixel units C1 receives the first common voltage Vcom1 through a first pixel common line pattern 23a connected to the first longitudinal common line 22a. Each of the second pixel units C2 receives the second common voltage Vcom2 through a second pixel common line pattern 23*b* connected to the second longitudinal common line 22*b*. The first pixel common line patterns 23*a* of the first pixel units C1 on adjacent horizontal lines are connected to the first longitudinal common line 22*a* between the first pixel common line patterns 23*a* in zigzags to supply the first common voltage Vcom1 to common electrodes of the first pixel units C1. The second pixel common line patterns 23*b* of the second pixel units C2 on adjacent horizontal lines are connected to the second longitudinal common line 22*b* between the second pixel common line patterns 23*b* in zigzags to supply the second common voltage Vcom2 to common electrodes of the second pixel units C2.

Figure 20:
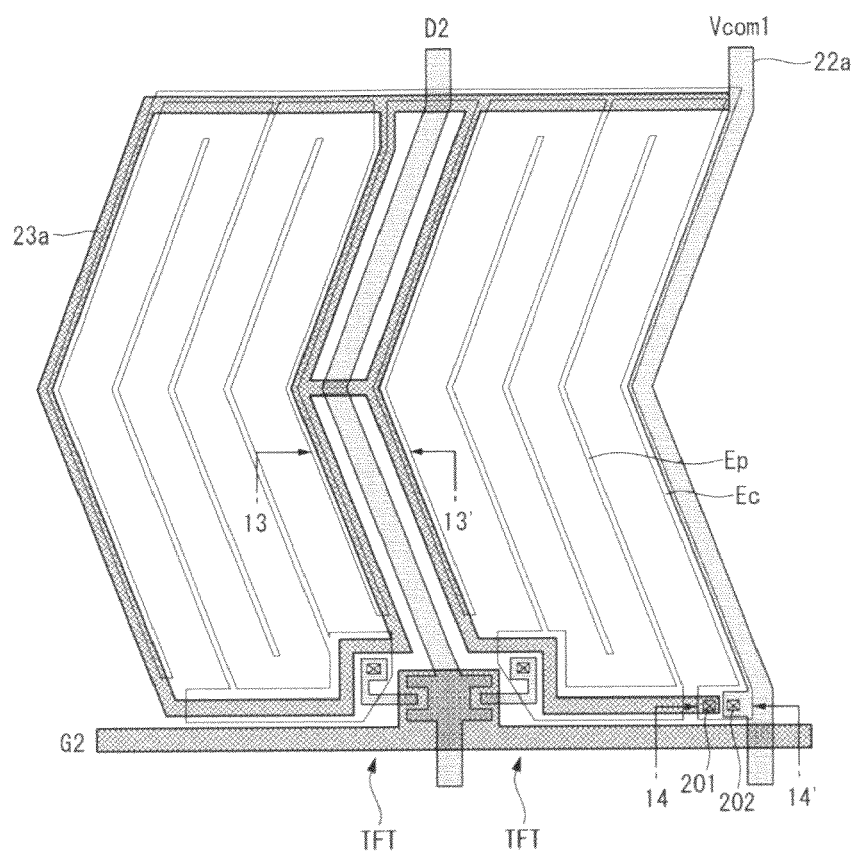
FIG. 20 is a plane view illustrating an exemplary operation of a first pixel unit shown in FIG. 19.
Figure 21:
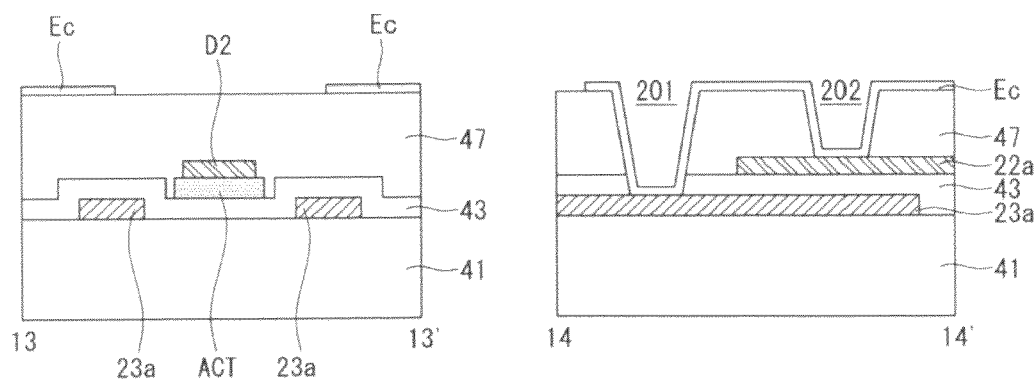
FIG. 21 is a cross-sectional view illustrating a connection structure taken along lines 13-13' and 14-14' of FIG. 20.

FIG. 20 illustrates an exemplary operation of the first pixel unit C1 shown in FIG. 19 in a super IPS mode. FIG. 21 illustrates a connection structure among the first longitudinal common line 22*a*, the first pixel common line pattern 23*a*, and the common electrode taken along lines 13-13' and 14-14' of FIG. 20.

As shown in FIGS. 20 and 21, the first pixel unit C1 includes one liquid crystal cell including a common electrode Ec and a pixel electrode Ep that are positioned opposite to each other on the same plane. The common electrode Ec partially overlapping the first longitudinal common line 22*a* is connected to the first longitudinal common line 22*a* through a first contact hole 202. The common electrodes Ec are connected to the first pixel common line pattern 23*a* through a second contact hole 201 exposing a portion of the first pixel common line pattern 23*a*. A storage capacitor Cst is formed in an overlap area of the first pixel common line pattern 23*a* and the pixel electrode Ep.

Figure 22:
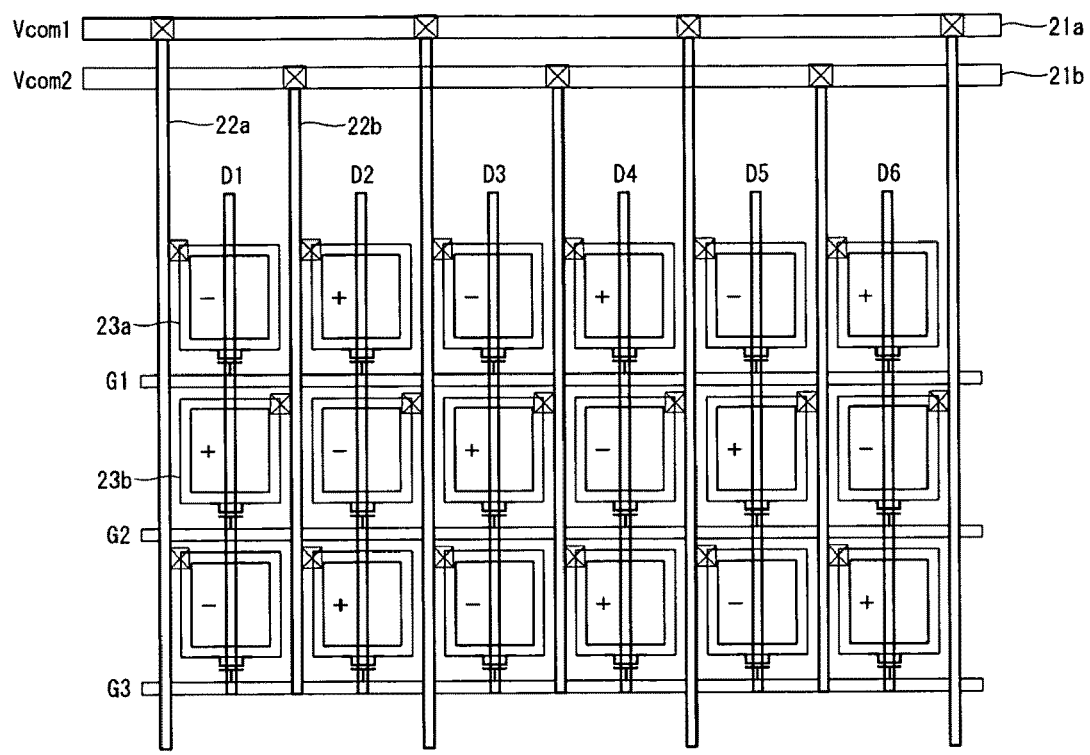
FIG. 22 illustrates a driving state of the liquid crystal display panel shown in FIG. 19 in a predetermined frame in which a first common voltage is greater than a second common voltage.

FIG. 22 illustrates a driving state of the liquid crystal display panel 10 having the third exemplary configuration in a predetermined frame in which the first common voltage Vcom1 is greater than the second common voltage Vcom2.

As shown in FIGS. 12A and 12B together with FIG. 22, because the first common voltage Vcom1 is greater than the maximum data voltage and the second common voltage Vcom2 is less than the minimum data voltage during an Nth frame period, a pixel unit receiving the first common voltage Vcom1 is negatively charged and a pixel unit receiving the second common voltage Vcom2 is positively charged. Hence, the liquid crystal display panel 10 has a charge polarity of a 1-dot inversion scheme. Although it is not shown, potentials of the first and second common voltages Vcom1 and Vcom2 during the Nth frame period are opposite to each other during an (N+1)th frame period. Therefore, a pixel unit receiving the first common voltage Vcom1 is positively charged and a pixel unit receiving the second common voltage Vcom2 is negatively charged during the (N+1)th frame period.

In the third exemplary configuration of the liquid crystal display panel 10, the distortion of the common voltage can be reduced by optimally disposing the common lines. Hence, a swing width of the data voltage can be reduced by stably swing the common voltage without causing a reduction in the image quality such as ripple or flicker. As a result, the power consumption can be reduced, the driving margins of the liquid crystals can increase by increasing the response speed, and the number of data drive ICs and the chip size the of data drive ICs can be reduced. Furthermore, because the dot inversion charging manner is easily applied to the third exemplary configuration of the liquid crystal display panel 10, the image quality can be greatly improved.

Figure 23:
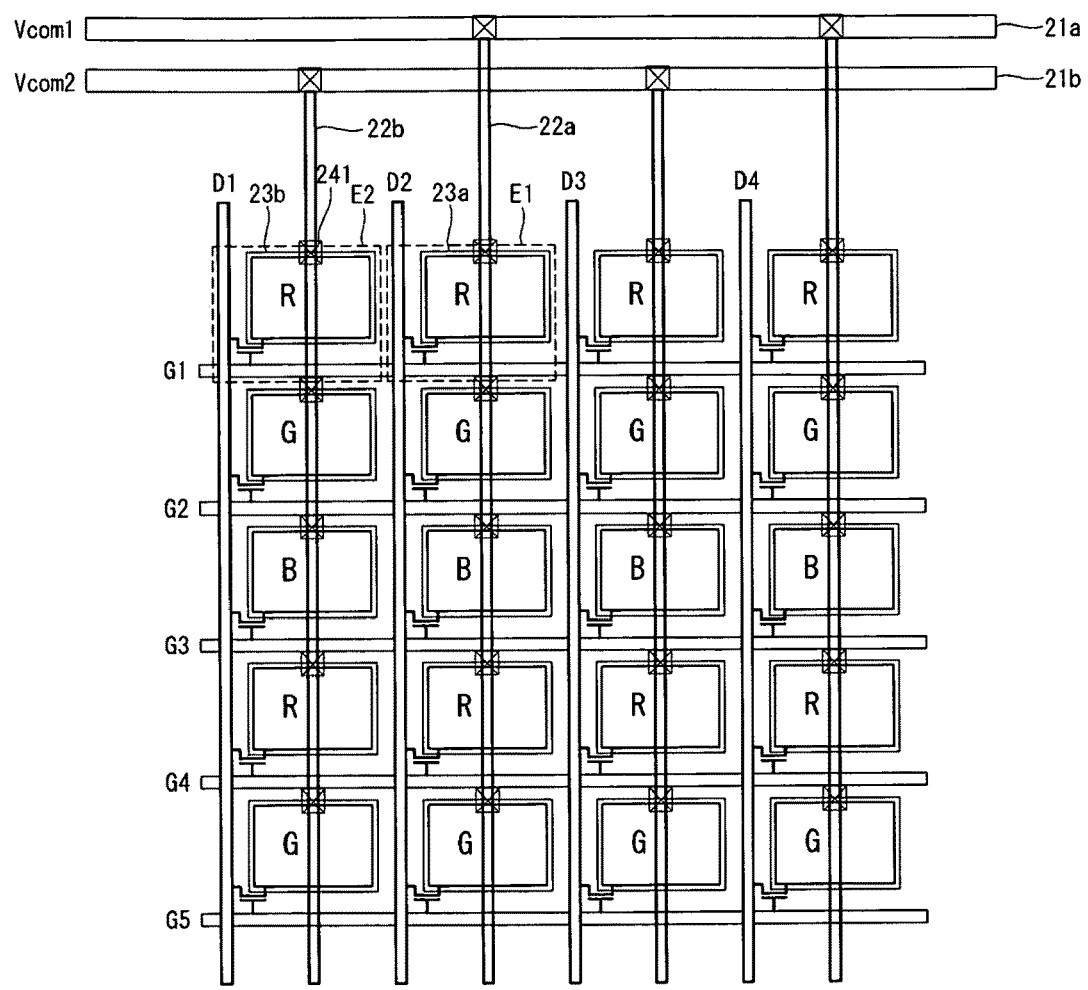
FIG. 23 illustrates a fourth exemplary configuration of a liquid crystal display panel for stably swinging a common voltage.

FIG. 23 illustrates a fourth exemplary configuration of the liquid crystal display panel 10 capable of stably supplying two common voltages, that are swung in opposite directions, to pixel units using the longitudinal common lines and the pixel common line patterns.

As shown in FIG. 23, in the fourth exemplary configuration of the liquid crystal display panel 10, the liquid crystal display according to the embodiment of the invention includes a plurality of pixel units, each of which includes one liquid crystal cell and a pixel common line pattern having a mesh structure in the liquid crystal cell. One gate line and one data line are assigned to each pixel unit. The first and second longitudinal common lines 22*a* and 22*b* crossing the middle of vertically adjacent liquid crystal cells are alternately positioned.

A plurality of first pixel units E1 and a plurality of second pixel units E2 constituting the plurality of pixel units are positioned in a stripe pattern. Each of the first pixel units E1 receives the first common voltage Vcom1 through a first pixel common line pattern 23*a* connected to the first longitudinal common line 22*a*. Each of the second pixel units E2 receives the second common voltage Vcom2 through a second pixel common line pattern 23*b* connected to the second longitudinal common line 22*b*.

Figure 24:
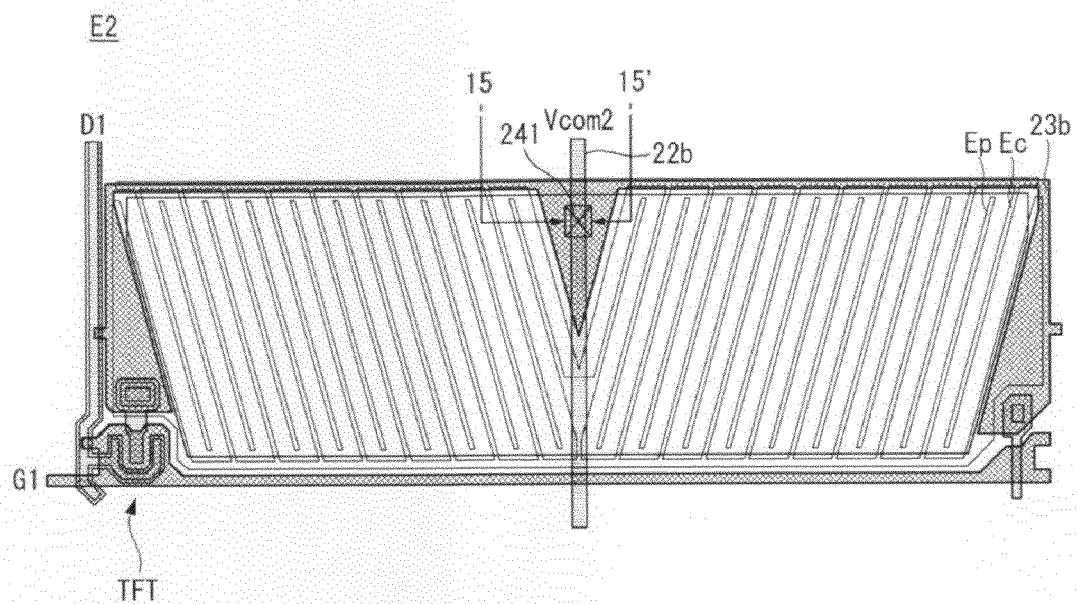
FIG. 24 is a plane view illustrating an exemplary operation of a second pixel unit shown in FIG. 23.
Figure 25:
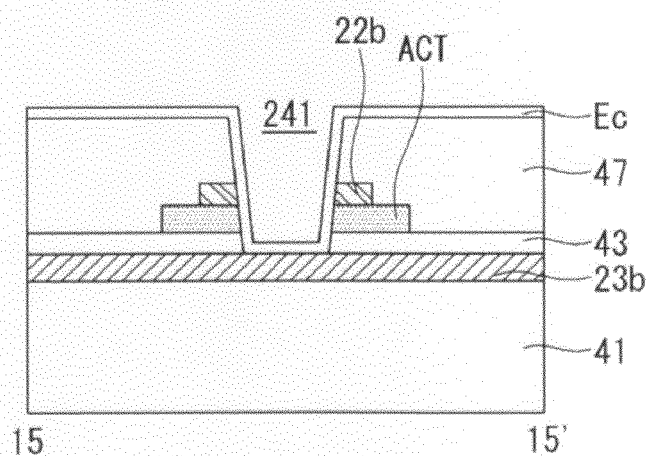
FIG. 25 is a cross-sectional view illustrating a connection structure taken along line 15-15' of FIG. 24.

FIG. 24 illustrates an exemplary operation of the second pixel unit E2 shown in FIG. 23 in a horizontal IPS mode. FIG. 25 illustrates a connection structure among the second longitudinal common line 22*b*, the second pixel common line pattern 23*b*, and the common electrode taken along line 15-15' of FIG. 24.

As shown in FIGS. 24 and 25, the second pixel unit E2 includes one liquid crystal cell including a common electrode Ec and a pixel electrode Ep that are positioned opposite to each other on the same plane. The liquid crystal cell of the second pixel unit E2 is divided into two domains by the second longitudinal common line 22*b* crossing the middle of the liquid crystal cell. The common electrode Ec partially overlapping the second longitudinal common line 22*b* and the second pixel common line pattern 23*b* is connected to the second longitudinal common line 22*b* and the second pixel common line pattern 23*b* through a contact hole 241. The common electrodes Ec are side-connected to the second longitudinal common line 22*b*. A storage capacitor Cst is formed in an overlap area of the second pixel common line pattern 23*b* and the pixel electrode Ep.

Figure 26:
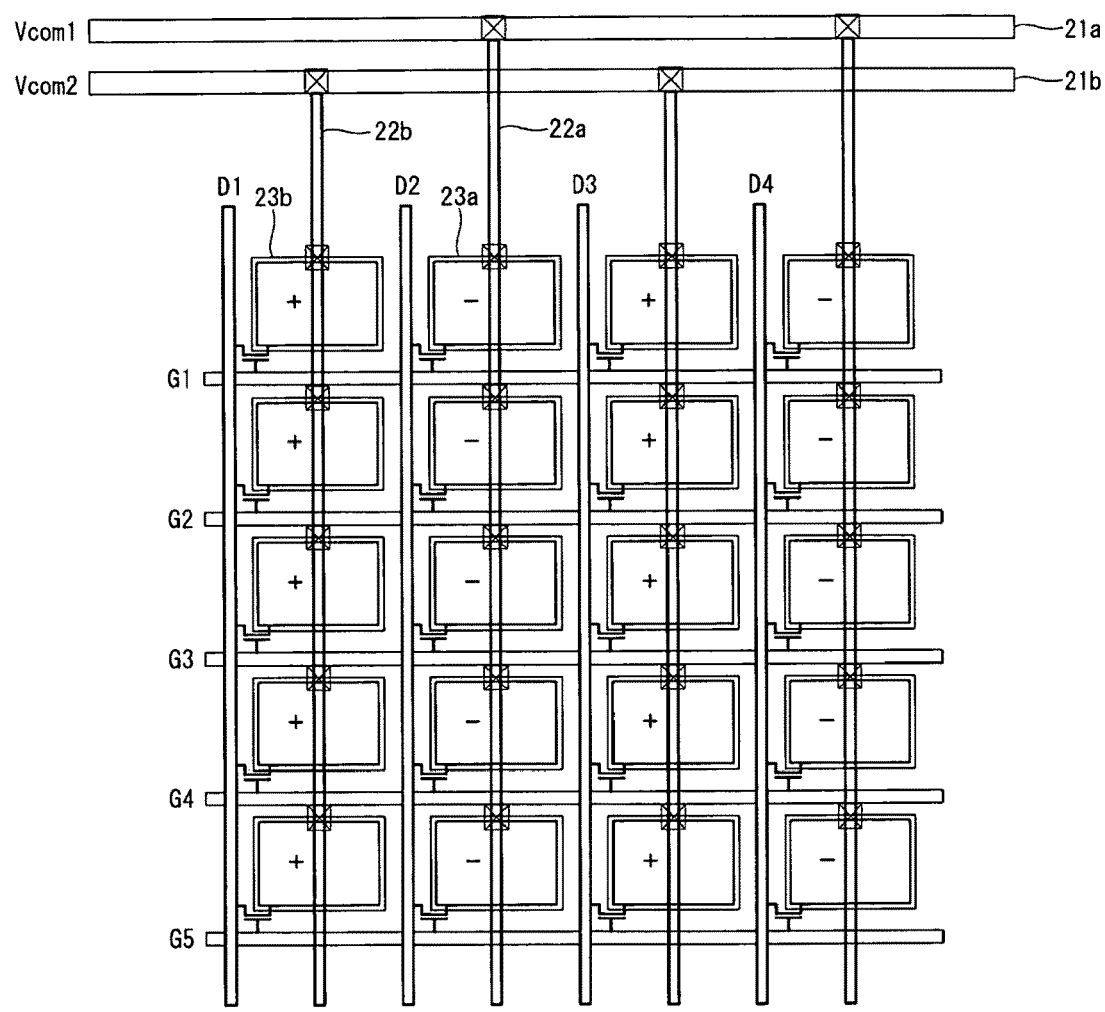
FIG. 26 illustrates a driving state of the liquid crystal display panel shown in FIG. 23 in a predetermined frame in which a first common voltage is greater than a second common voltage.

FIG. 26 illustrates a driving state of the liquid crystal display panel 10 having the fourth exemplary configuration in a predetermined frame in which the first common voltage Vcom1 is greater than the second common voltage Vcom2.

As shown in FIGS. 12A and 12B together with FIG. 26, because the first common voltage Vcom1 is greater than the maximum data voltage and the second common voltage Vcom2 is less than the minimum data voltage during an Nth frame period, a pixel unit receiving the first common voltage Vcom1 is negatively charged and a pixel unit receiving the second common voltage Vcom2 is positively charged. Hence, the liquid crystal display panel 10 has a charge polarity of a column inversion scheme. Although it is not shown, potentials of the first and second common voltages Vcom1 and Vcom2 during the Nth frame period are opposite to each other during an (N+1)th frame period. Therefore, a pixel unit receiving the first common voltage Vcom1 is positively charged and a pixel unit receiving the second common voltage Vcom2 is negatively charged during the (N+1)th frame period.

In the fourth exemplary configuration of the liquid crystal display panel 10, a distortion of the common voltage can be reduced by optimally disposing the common lines. Hence, a swing width of the data voltage can be reduced by stably swing the common voltage without causing a reduction in the image quality such as ripple or flicker. As a result, the power consumption can be reduced, the driving margins of the liquid crystals can increase by increasing the response speed, and the number of data drive ICs and the chip size the of data drive ICs can be reduced.

Figure 27:
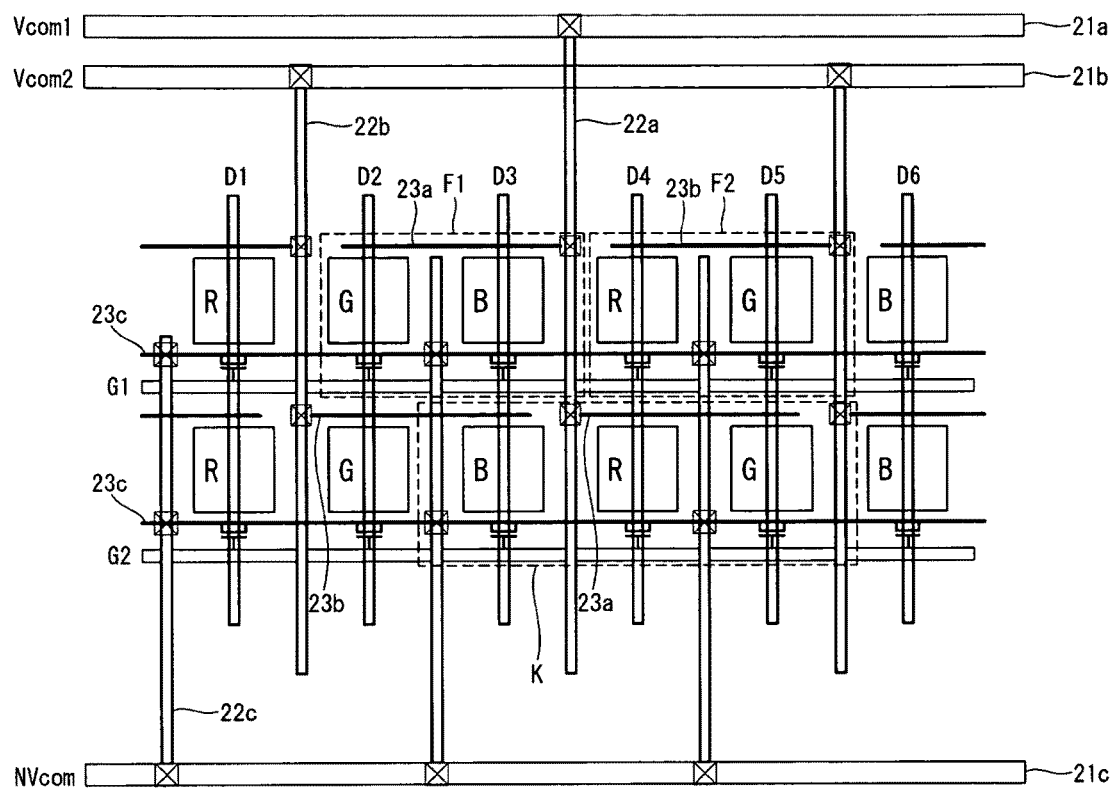
FIG. 27 illustrates a fifth exemplary configuration of a liquid crystal display panel for stably swinging a common voltage.

FIG. 27 illustrates a fifth exemplary configuration of the liquid crystal display panel 10 capable of stably supplying two common voltages, that are swung in opposite directions, to pixel units using the longitudinal common lines and the pixel common line patterns.

As shown in FIG. 27, in the fifth exemplary configuration of the liquid crystal display panel 10, the liquid crystal display according to the embodiment of the invention includes a plurality of pixel units, each of which includes two horizontally adjacent liquid crystal cells and a pixel common line pattern that is formed parallel to the gate lines along one side of each of the two horizontally adjacent liquid crystal cells. One gate line and two data lines are assigned to each pixel unit. The first longitudinal common line 22a and the second longitudinal common line 22b are alternately positioned between the horizontally adjacent pixel units. One liquid crystal cell is divided into two domains so that each of the data lines crosses the middle of vertically adjacent liquid crystal cells. For this, two TFTs are formed in each liquid crystal cell. The pixel common line patterns of the horizontally and vertically adjacent pixel units are electrically separated from one another. The liquid crystal display according to the embodiment of the invention further includes a normal edge common line 21c, a normal longitudinal common line 22c, and a normal common line pattern 23c that are used to supply a normal common voltage NVcom used to form a storage capacitor in addition to the first and second common voltages Vcom1 and Vcom2 for a drive. The normal edge common line 21c is separated from the first and second edge common lines 21a and 21b on the non-display area to receive the normal common voltage NVcom from the common voltage generation unit 14. The normal longitudinal common line 22c is formed between the first and second longitudinal common lines 22a and 22b in a direction parallel to the data lines and is connected to the normal edge common line 21c. The normal common voltage NVcom has a level approximately equal to a low level of the first and second common voltages Vcom1 and Vcom2. The normal common line pattern 23c is connected to the normal longitudinal common line 22c and partially overlaps the pixel electrodes of the liquid crystal cells of each pixel unit.

A plurality of first pixel units F1 and a plurality of second pixel units F2 constituting the plurality of pixel units are positioned in a mosaic pattern. Each of the first pixel units F1 receives the first common voltage Vcom1 through a first pixel common line pattern 23a connected to the first longitudinal common line 22a. Each of the second pixel units F2 receives the second common voltage Vcom2 through a second pixel common line pattern 23b connected to the second longitudinal common line 22b. The first pixel common line patterns 23a of the first pixel units F1 on adjacent horizontal lines are connected to the first longitudinal common line 22a between the first pixel common line patterns 23a in zigzags to supply the first common voltage Vcom1 to common electrodes of the first pixel units F1. The second pixel common line patterns 23b of the second pixel units F2 on adjacent horizontal lines are connected to the second longitudinal common line 22b between the second pixel common line patterns 23b in zigzags to supply the second common voltage Vcom2 to common electrodes of the second pixel units F2. The normal edge common line 21c and the normal common line pattern 23c may be formed of a gate metal material, and the normal longitudinal common line 22c may be formed of a data metal material.

Figure 28:
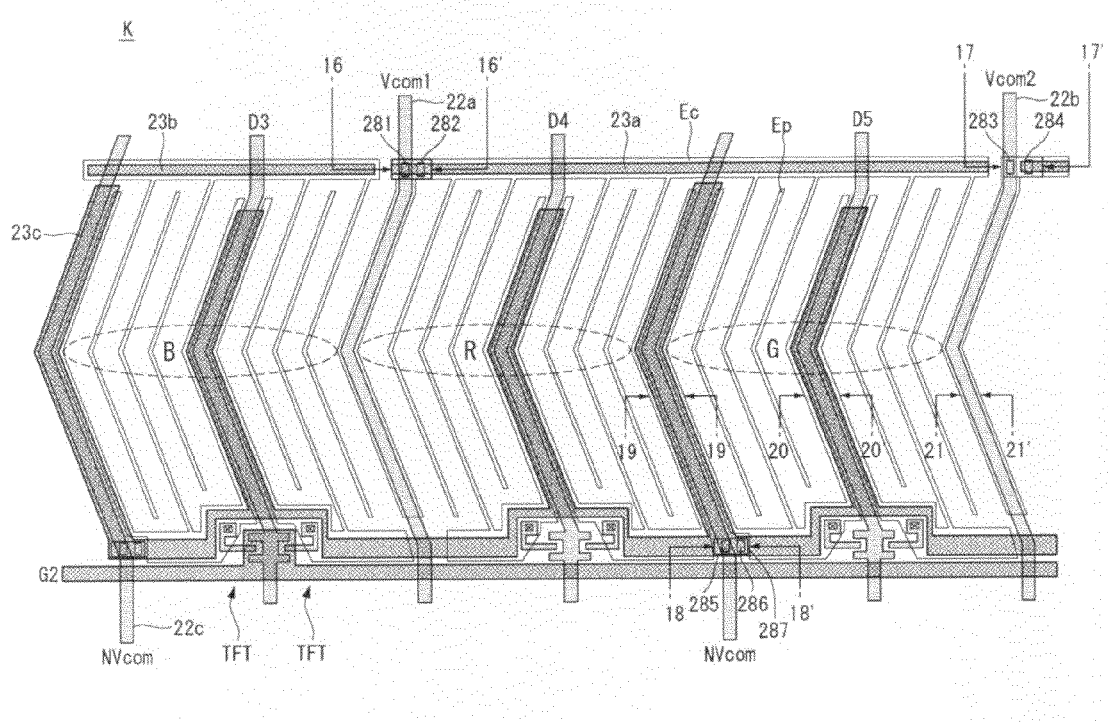
FIG. 28 is a plane view illustrating an exemplary operation of a "K" portion shown in FIG. 27.
Figure 29:
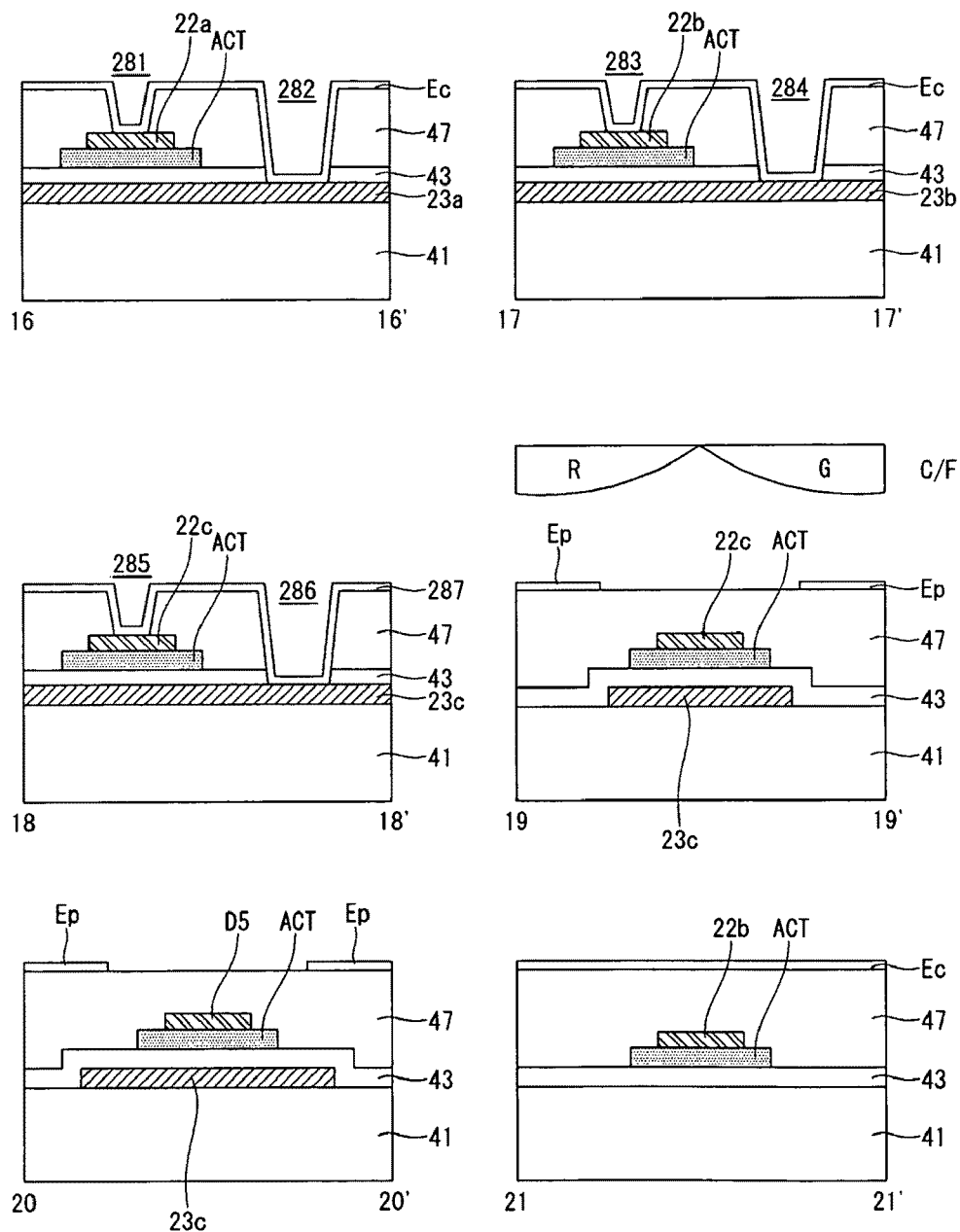
FIG. 29 is a cross-sectional view illustrating a connection structure taken along lines 16-16', 17-17', 18-18', 19-19', 20-20' and 21-21' of FIG. 28.

FIG. 28 illustrates an exemplary operation of a "K" portion shown in FIG. 27 in a super IPS mode. FIG. 29 illustrates a connection structure among the first and second longitudinal common lines 22a and 22b, the first and second pixel common line patterns 23a and 23b, the normal longitudinal common line 22c, the normal common line pattern 23c, and the common electrode taken along lines 16-16', 17-17', 18-18', 19-19', 20-20' and 21-21' of FIG. 28.

As shown in FIGS. 28 and 29, the "K" portion includes R and G liquid crystal cells each including a common electrode Ec and a pixel electrode Ep that are positioned opposite to each other on the same plane. The R and G liquid crystal cells constitute the first pixel unit F1. In the first pixel unit F1, the common electrode Ec is connected to the first longitudinal common line 22a through a first contact hole 281 and is connected to the first pixel common line pattern 23a through a second contact hole 282. In the second pixel unit F2, the common electrode Ec is connected to the second longitudinal common line 22b through a third contact hole 283 and is connected to the second pixel common line pattern 23b through a fourth contact hole 284. In the first pixel unit F1, the normal common line pattern 23c is connected to the normal longitudinal common line 22c through a fifth contact hole 285, a sixth contact hole 286, and a transparent electrode pattern 287. A storage capacitor Cst is formed in an overlap area of the normal common line pattern 23c and the pixel electrode Ep. In particular, as shown in the cross-sectional view taken along line 19-19', because the normal longitudinal common line 22c between two liquid crystal cells constituting each pixel unit can shield light interference, a black matrix can be removed between the two liquid crystal cells (i.e., a formation portion of the normal longitudinal common line 22c).

Figure 30:
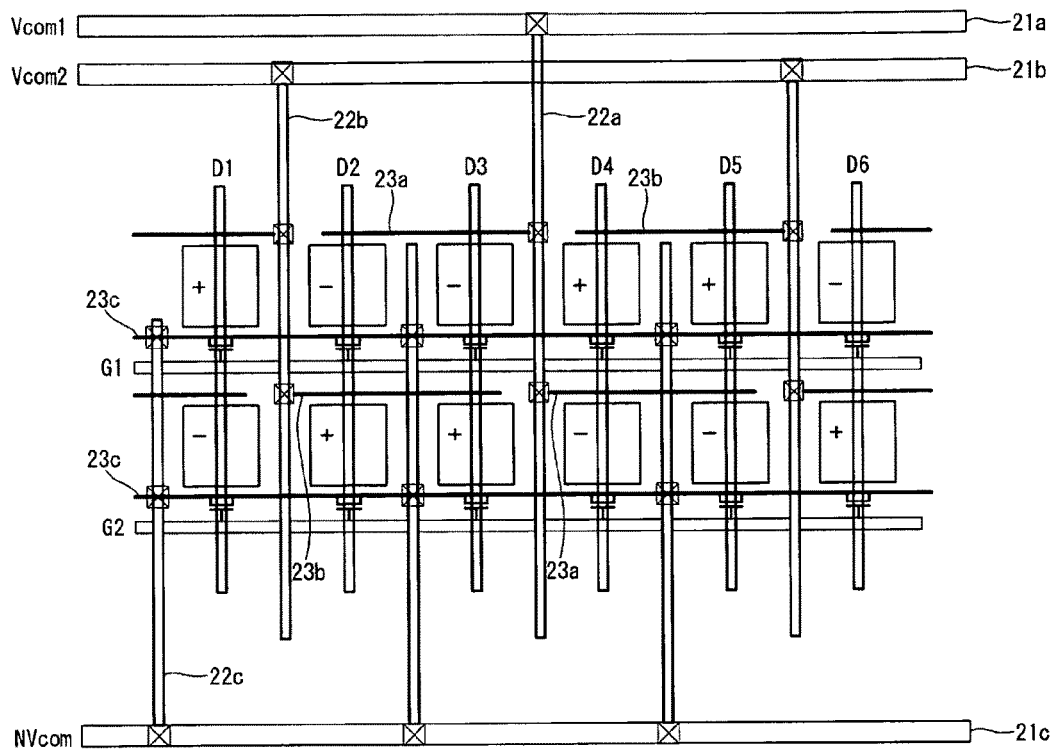
FIG. 30 illustrates a driving state of the liquid crystal display panel shown in FIG. 27 in a predetermined frame in which a first common voltage is greater than a second common voltage.

FIG. 30 illustrates a driving state of the liquid crystal display panel 10 having the fifth exemplary configuration in a predetermined frame in which the first common voltage Vcom1 is greater than the second common voltage Vcom2.

As shown in FIGS. 12A and 12B together with FIG. 30, because the first common voltage Vcom1 is greater than the maximum data voltage and the second common voltage Vcom2 is less than the minimum data voltage during an Nth frame period, a pixel unit receiving the first common voltage Vcom1 is negatively charged and a pixel unit receiving the second common voltage Vcom2 is positively charged. Hence, the liquid crystal display panel 10 has a charge polarity shown in FIG. 30. Although it is not shown, potentials of the first and second common voltages Vcom1 and Vcom2 during the Nth frame period are opposite to each other during an (N+1)th frame period. Therefore, a pixel unit receiving the first common voltage Vcom1 is positively charged and a pixel unit receiving the second common voltage Vcom2 is negatively charged during the (N+1)th frame period.

In the fifth exemplary configuration of the liquid crystal display panel 10, a distortion of the common voltage can be reduced by optimally disposing the common lines. Hence, a swing width of the data voltage can be reduced by stably swing the common voltage without causing a reduction in the image quality such as ripple or flicker. As a result, the power consumption can be reduced, the response speed can increase, and the number of data drive ICs and the chip size the of data drive ICs can be reduced. Furthermore, in the fifth exemplary configuration of the liquid crystal display panel 10, because the common voltage is divided into the driving common voltage and the common voltage for the formation of the storage capacitor, DC image sticking can be easily removed by preventing a DC component from being accumulated inside the liquid crystal cell. The yield can increase by removing the black matrix.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A liquid crystal display comprising:
   a liquid crystal display panel including a display area where a plurality of first pixel units each including at least one liquid crystal cell and a plurality of second pixel units each including at least one liquid crystal cell are positioned and a plurality of data lines and a plurality of gate lines are formed to cross each other;
   a common voltage generation unit that swings a first common voltage and a second common voltage between two voltage levels in opposite directions every predetermined period of time;
   a plurality of first longitudinal common lines that are formed parallel to the data lines to supply the first common voltage input through a plurality of first input units to a plurality of first pixel common line patterns formed in the plurality of first pixel units, each of the first pixel common line patterns having mesh structure;
   a plurality of second longitudinal common lines that are formed parallel to the data lines to supply the second common voltage input through a plurality of second input units to a plurality of second pixel common line patterns formed in the plurality of second pixel units, each of the second pixel common line patterns having mesh structure; and
   a plurality of data drive integrated circuits (ICs) for driving the data lines,
   wherein the first input units include a plurality of first common voltage input pads, each of which is connected to one dummy channel of both dummy channels of each of the data drive ICs, and
   wherein the second input units include a plurality of second common voltage input pads, each of which is connected to the other dummy channel of each of the data drive ICs.

2. The liquid crystal display of claim 1, further comprising:
   a first edge common line that is formed in a non-display area outside the display area to electrically connect the first input units to the first longitudinal common lines; and
   a second edge common line that is formed in the non-display area separately from the first edge common line to electrically connect the second input units to the second longitudinal common lines.

3. The liquid crystal display of claim 2, wherein the first and second edge common lines and the first and second pixel common line patterns have the same metal pattern as the gate lines,
   wherein the first and second longitudinal common lines have the same metal pattern as the data lines.

4. The liquid crystal display of claim 2, wherein the first pixel units and the second pixel units are positioned in a mosaic pattern or in a stripe pattern.

5. The liquid crystal display of claim 4, wherein when the first pixel units and the second pixel units are positioned in the mosaic pattern, the first pixel common line patterns of the first pixel units on adjacent horizontal lines are connected to the first longitudinal common line between the first pixel common line patterns in zigzags to supply the first common voltage to first common electrodes of the first pixel units, and the second pixel common line patterns of the second pixel units on adjacent horizontal lines are connected to the second longitudinal common line between the second pixel common line patterns in zigzags to supply the second common voltage to second common electrodes of the second pixel units.

6. The liquid crystal display of claim 5, wherein each of the first pixel unit and the second pixel unit includes two horizontally adjacent liquid crystal cells,
   wherein two gate lines and one data line are assigned to each of the first and second pixel units,
   wherein the first longitudinal common line and the second longitudinal common line are alternately positioned between horizontally adjacent pixel units.

7. The liquid crystal display of claim 5, wherein each of the first pixel unit and the second pixel unit includes three horizontally adjacent liquid crystal cells,
   wherein two gate lines and two data lines are assigned to each of the first and second pixel units,
   wherein the first longitudinal common line and the second longitudinal common line are alternately positioned between horizontally adjacent el pixel units.

8. The liquid crystal display of claim 5, wherein each of the first pixel unit and the second pixel unit includes one liquid crystal cell,
   wherein one gate line and one data line crossing the middle of the pixel unit are assigned to each of the first and second pixel units,
   wherein the first longitudinal common line and the second longitudinal common line are alternately positioned between horizontally adjacent pixel units.

9. The liquid crystal display of claim 6, further comprising:
   a normal edge common line that is separated from the first and second edge common lines in the non-display area to receive a normal common voltage;
   a plurality of normal longitudinal common lines, each of which is formed between the first and second longitudinal common lines in a direction parallel to the data lines; and
   a normal common line pattern that partially overlaps pixel electrodes of the liquid crystal cells and is commonly connected to the normal longitudinal common lines.

10. The liquid crystal display of claim 4, wherein when the first pixel units and the second pixel units are positioned in the stripe pattern, the first pixel common line patterns of the first pixel units on the same vertical line are commonly connected to the first longitudinal common line crossing the first pixel common line patterns to supply the first common voltage to first common electrodes of the first pixel units, and the second pixel common line patterns of the second pixel units on the same vertical line are commonly connected to the second longitudinal common line crossing the second pixel common line patterns to supply the second common voltage to second common electrodes of the second pixel units.

11. The liquid crystal display of claim 10, wherein each of the first pixel unit and the second pixel unit includes one liquid crystal cell,
wherein one gate line and one data line are assigned to each of the first and second pixel units,
wherein the first and second longitudinal common lines crossing the middle of vertically adjacent liquid crystal cells are alternately positioned.

12. The liquid crystal display of claim 1, wherein one of the two voltage levels is greater than the other,
wherein the one voltage level has a potential equal to or greater than a maximum data voltage, and the other voltage level has a potential equal to or less than a minimum data voltage.

13. The liquid crystal display of claim 9, wherein the normal common voltage has a voltage level equal to or less than a low voltage level of the first and second common voltages.

14. The crystal display of claim 2, wherein a width of each of the first and second edge common line is greater than a width of each of the first and second longitudinal common lines.

* * * * *